(12) United States Patent
Kell

(10) Patent No.: US 7,343,261 B1
(45) Date of Patent: Mar. 11, 2008

(54) UNDERWATER SENSOR TRANSMITTER PROBE

(76) Inventor: Curtis Kell, 35417 Oak Knoll Rd., Burlington, WI (US) 53105

( * ) Notice: Subject to any disclaimer, the term of this patent is extended or adjusted under 35 U.S.C. 154(b) by 33 days.

(21) Appl. No.: 11/342,924

(22) Filed: Jan. 30, 2006

Related U.S. Application Data

(60) Provisional application No. 60/648,876, filed on Feb. 1, 2005.

(51) Int. Cl.
*G06F 19/00* (2006.01)

(52) U.S. Cl. .......... 702/127; 43/4; 43/17; 324/160; 324/166; 340/539.26; 340/584; 340/603; 340/606; 340/870.01; 340/870.07; 340/870.31; 340/984; 702/130; 702/142; 702/189

(58) Field of Classification Search .......... 235/94 R; 324/160, 163, 164, 166, 167; 340/310.11, 340/310.17, 531, 539.1, 539.26, 584, 603, 340/606, 853.1, 854.1, 854.3, 854.4, 854.6, 340/854.8, 854.9, 855.1, 855.2, 855.8, 856.3, 340/870.01, 870.07, 870.18, 870.3, 870.31, 340/984; 702/127, 130, 142, 179, 187, 189, 702/199; 43/4, 17
See application file for complete search history.

(56) References Cited

U.S. PATENT DOCUMENTS 2,507,351 A * 5/1950 Scherbatskoy .......... 340/854.6
2,841,778 A * 7/1958 Ball et al. .............. 340/854.1
2,974,303 A * 3/1961 Dixon .................... 340/855.3
3,082,400 A * 3/1963 Coop ....................... 340/850
3,212,601 A * 10/1965 Summers ................ 340/854.2
3,216,524 A * 11/1965 Summers ................ 340/854.1
3,268,880 A * 8/1966 Miller .................... 340/870.18
3,341,808 A * 9/1967 Morris et al. ............ 367/134
3,431,778 A * 3/1969 Lemon et al. ............. 73/181
3,973,349 A * 8/1976 England .................. 43/42.03
4,805,160 A * 2/1989 Ishii et al. ................ 367/134
5,782,033 A * 7/1998 Park et al. ..................... 43/4
7,034,711 B2* 4/2006 Sakatani et al. ........ 340/686.1
2003/0030565 A1* 2/2003 Sakatani et al. ........... 340/679
2006/0145881 A1* 7/2006 Sakatani et al. ........... 340/679
2007/0203623 A1* 8/2007 Saunders et al. ............ 701/23

* cited by examiner

*Primary Examiner*—Edward R Cosimano
(74) *Attorney, Agent, or Firm*—Michael I. Kroll

(57) ABSTRACT

An electronic apparatus for measuring water speed and water temperature then periodically transmitting said data during controlled depth fishing wherein an underwater probe is secured to and insulated conductive downrigger cable and gathers and relays data though the cable to a remote receiver/display unit disposed on the watercraft.

71 Claims, 34 Drawing Sheets

UNDERWATER SENSOR TRANSMITTER PROBE

RELATED APPLICATIONS

This application is subject to now expired U.S. provisional application Ser. No. 60/648,876 filed 1 Feb. 2005. Please incorporate by reference all information in said provisional application into this instant application.

BACKGROUND OF THE INVENTION

1. Field of the Invention

Controlled depth fishing has been a popular sport for many years. Controlled depth fishing methods allow fishermen to troll a lure such as a spoon, crankbait, dodger-fly combination, etc. at depths much greater that the lure would dive on its own.

Controlled depth fishing is accomplished by means of a downrigger mounted to a watercraft. The downrigger is comprised of a frame which mounts to a boat, a reel with an electric motor or hand crank mechanism, a boom extending from the boat over the water, a pulley at the end of the boom, stainless steel cable that is spooled onto the reel and threaded through the pulley at the end of the boom, and a cannonball attached to the end of the cable. The cannonball is usually constructed of lead and typically weighs between 10 pounds to 18 pounds. The downrigger may also include a counter connected to the reel and calibrated in feet to indicate to the user how far below the water surface the cannonball is tracking. FIG. 1 illustrates a typical downrigger.

To use a downrigger in controlled depth fishing, the fisherman would first allow a lure attached to a standard fishing reel and pole to troll out behind the watercraft. Typically the lure is let out about 10 to 30 feet. The fisherman would then attach the line from the rod and reel to the cannonball with a rubber band or pincher type release mechanism. The fisherman would then slowly allow the cannonball to descend into the water to a predetermined depth. The depth can be read from the counter on downriggers so equipped. In this scenario, the lure is now running at the depth of the cannonball. This depth would also be shown on the downrigger's counter. FIG. 2 illustrates the details controlled depth fishing. Note that the lure attached to the rod and reel is now being trolled at the depth of the cannonball.

When a fish strikes the lure, the strike either breaks the rubber band attaching the line to the cannonball or pulls the line out of the pincher release and allows the fisherman to fight the fish with just the rod and reel. Once the line is released from the cannonball, the downrigger no longer plays a part in the fighting and retrieval of the fish. FIG. 3 illustrates a scenario right after the rubber band has broken or pincher has released.

Controlled depth fishing has been proven to be a very effective method for catching fish species such as Salmon and Trout in the Great Lakes. It has also proved to be an effective method for catching a wide variety of fish in the ocean.

Additionally, it is well known that fish such as Salmon and Trout prefer waters of certain temperature ranges and will seek out the waters that provide these temperatures. Additionally, it has been found that fish are most likely to strike a lure traveling or trolled at a specific range of speed. Therefore, fisherman will seek a particular temperature of water and a troll at a specific speed when targeting a specific species of fish.

Most watercraft used for fishing usually includes a means for measuring water surface temperature and surface speed. However, this information usually has no bearing as to what water temperature and water speed are well below the surface at the cannonball and lure.

2. Description of the Prior Art

Over the past decade or so, there have been several electronic apparatus sold to fisherman who practice controlled depth fishing to measure the water temperature and water speed at the cannonball and lure. These systems are comprised of an underwater sensor/transmitter probe, a special downrigger cable with a plastic coating, a receiving antenna, a receiver/display unit, and a shield cable that connects the receiving antenna to the receiver/display unit, and a power cable that provides 12V boat power to the receiver/display unit.

The theory of operation of such a system is as follows:

The underwater probe unit is mechanically and electrically attached to the special coated downrigger cable as to provide a strong mechanical connection to suspend the probe, as well as provide an electrical connection such that the downrigger wire is used as a signal path to the watercraft. This connection must be wrapped in a special rubberized electrical tape or apply liquid sealant to electrically isolate the connection from the water. The probe transmits its sensed data over this cable via a low frequency RF signal—typically anywhere between 100 KHz and 500 KHz.

A drop leader of 18"-24" typical is attached to the bottom tab of the underwater probe, and the cannonball is then attached to this leader to provide the weight necessary to hold the probe and fishing lure at a predetermined depth.

A pick-up antenna in the form of a spring with multiple turns of wire is used to receive the signal sent on the downrigger cable from the underwater probe. The downrigger cable passes through the center of the spring. The spring is also attached to a cable (usually shielded cable or coax). This antenna cable then connects to another cable (usually shielded cable or coax) which carries the signal received from the underwater probe to the receiver/display module.

The underwater probe periodically measures water temperature and speed with respect to the surrounding water; and periodically reports this information to the receiver/display unit by transmitting the sensed data via an RF signal over the coated downrigger cable.

The receiver/display module monitors the received signal, decodes the data and displays the speed and temperature as reported by the probe on the LCD display for viewing by the operator. FIG. 4 illustrates the major components of the system as well as their connectivity.

The installer replaces the ordinary downrigger cable with the special coated cable. This coated cable is then attached to the underwater sensor/transmitter probe. To make the attachment to the probe, the coating on the cable must be stripped away such that there is an electrical connection between the cable and the metal tab on the probe unit. The user would then install a thimble and barrel crimps to secure the cable to the tab. Once the barrel crimps are installed, the user would then insolate this connection with a special rubberized electrical tape to isolate the electrical connection from the water. FIG. 5 illustrates this interconnection method between the coated downrigger cable and the underwater probe. FIG. 6 illustrates this connection after rubberized electrical tape has been applied.

The spring antenna is mounted to the downrigger boom as illustrated in FIG. 7. The coated downrigger cable passes through the center of the spring antenna. The shielded cable connecting to the spring antenna is mounted to the downrigger boom—typically with nylon tie straps. The tie straps are usually positioned at least 6-10" from the spring antenna to allow the antenna to flex and move with the downrigger cable. This is necessary so that the shielded cable is not damaged from the constant movement of the spring antenna/downrigger cable.

The antenna cable includes a connector on the end opposite the spring antenna. This connector is plugged into a second shielded cable with connectors on both ends. This cable is then routed throughout the watercraft up to the display/receiver unit, where it plugs into a connector on the receiver/display.

The receiver/display unit is mounted on the watercraft in a convenient viewing location. A third cable, the power cable, is plugged into the receiver/display unit. The opposite end of the power cable is wired directly into the 12VDC power of the watercraft.

Further, another system readily available to fisherman operates in a similar fashion to the system described above, but additionally includes a means for the underwater sensor/transmitter unit to measure ambient light intensity, water pressure, and probe battery voltage. This information is transmitted up the coated downrigger cable in addition to the speed and temperature information. The receiver/display in this system also includes provisions to decode this information and display it on the LCD screen. The receiver/display unit converts measured pressure into depth. In this system, water temperature, water speed, probe battery voltage, ambient light intensity (in percentage) and probe depth are displayed on the LCD.

Shortcomings of Prior Art:

Many fishermen have expressed great disappointment in being required to use the special coated downrigger cable to carry the underwater probe transmitted signal to the spring antenna mounted on the downrigger boom. After weeks and months of use, the coating on the cable may become damaged or frayed, thereby exposing the inner conductor to the water. When water contacts the conductor in the coated cable, the signal becomes attenuated, and at a certain depth, the system no longer operates. As an example, with new coated cable the system may operate to 200' of water. However, when the insulating coating becomes damaged and frayed thereby exposing the inner conductor to water, system operation may be limited to 40' or less—depending on the extent of damage to the insulating coating—again, this is due to the attenuation effects of the water on the transmitted signal. Further, this special coated cable is much more expensive than ordinary downrigger cable, and therefore it costs the user time and money to replace the coated cable. Still further, the cable is of larger diameter than ordinary cable due to the insulating coating, and this additional diameter increases the cables drag in water causing the cannonball to run much father behind the boat at normal trolling speeds as compared to a cable without the coating.

Another shortcoming is that of an underwater probe of the prior art that is large and bulky. Large probes cause additional drag in the water, and therefore cause the downrigger cannonball to track much farther behind the boat than the cannonball would track without the probe attached to the downrigger cable. Ideally, the fisherman would like the cannonball to track directly beneath the watercraft. The more drag on the system, the farther behind the watercraft the cannonball will track.

Still another shortcoming of the underwater probe of the prior art is that many times they do not track true with respect to the line of motion of the watercraft. This is due to the ferromagnetic rotor or 'paddle wheel' that is mounted on the side of the probe unit—causing the probe to 'dog track' or track at somewhat of an angle to the line of motion of the watercraft.

Yet another shortcoming of the underwater probe of the prior art is that of the wire and snap-clip attachment means of the 9V battery. This snap-clip attachment means can become damaged over time, and the wires can fatigue and break—requiring the probe to be sent in for repair.

Yet another shortcoming of the underwater probe of the prior art is that the electronics are not sealed against water damage should the O-rings that seal the battery cover fail. Once water enters the unit, the electronics become submerged in water and potential permanent failure of the electronics could occur.

Yet another shortcoming of the underwater probe of the prior art is that the housing only includes one O-ring seal to seal the battery cover to the housing. Many times the single O-ring seal becomes damaged and allows water to enter the probe.

Yet another shortcoming of the underwater probe of the prior art is that the electronics consume a fair amount of power, requiring the user to replace the 9V battery at regular intervals during use.

Yet another shortcoming of the underwater probe of the prior art is that the design is not such that it can be easily injection molded and has to be machined from tubular plastic piping such as PVC.

Yet another shortcoming of the underwater probe of the prior art is that it is not easily manufactured and requires a large amount of labor.

Yet another shortcoming of the underwater probe of the prior art is that the housing has a geometry which does not easily lend itself to applying rubberized electrical tape to create an adequate seal against water intrusion.

A shortcoming of the spring antenna of the prior art is that it does not provide adequate means to recover maximum amount of received signal due to its construction of only a few turns of wire and short length.

Yet another shortcoming of the antenna of prior art is that the spring-to-cable connection is covered with heat shrink tubing and is mechanically weak and prone to breakage.

A shortcoming of the receiver/display unit of the prior art is that while it displays the underwater probe's battery voltage, the average user does not possess the detailed knowledge required to determine at what voltage should the probe battery be replaced.

Another shortcoming of the receiver/display unit of the prior art is that there is no backlight for the LCD to be viewed at night, and if a backlight is provided, it is not user adjustable.

Another shortcoming of the receiver/display unit of the prior art is that there is no backlight for the user controls to be viewed at night, and if a backlight is provided, it is not user adjustable.

Another shortcoming of the receiver of the prior art is that the input signal receiving circuitry does not provide adequate selectivity to the specific received signal frequency.

Yet another shortcoming of the receiver/display unit of the prior art is that it does not provide a means for easy software updates such as new speed and temperature calibration tables, new software features, and the like.

Yet another shortcoming of the receiver/display unit of the prior art is that it does not provide a means for the user to calibrate the speed and temperature as reported by the probe to a separate system on the watercraft that measures surface speed and temperature.

Yet another shortcoming of the receiver/display unit of the prior art is that it requires the user to manually shut if off after use. If a user forgets to shut it off, it continues to consume boat battery power—which could lead to a dead boat battery over a period of time.

Yet another shortcoming of the receiver/display unit of the prior art is that it does not allow the user to variably adjust the averaging of displayed data to compensate for calm or wavy water conditions.

Yet another shortcoming of the receiver/display unit of prior art is that it is large and bulky thereby limiting mounting locations on the watercraft.

While the methods described above for measuring water temperature and water speed at the underwater probe as well as optionally measuring probe battery voltage, water pressure and water clarity at the probe may be suitable for the purposes for which they were designed, they would not be suitable for the purposes of the present invention, as hereinafter described.

SUMMARY OF PRESENT INVENTION

A primary object of the present invention is to provide a measurement and reporting system that overcomes the shortcomings of the prior art.

Another object of the present invention is to eliminate the coated downrigger cable. Prior art systems must use the coated downrigger cable to prevent the lake water from attenuating the transmitted signal from the underwater probe. If the center conductor of the coated wire is exposed to the lake water, the signal level is reduced and the maximum depth of system operation is degraded.

However, it has been discovered that even if the insulating coating was completely eliminated from the downrigger cable, all the signal is not attenuated. There still exists a very small signal at the antenna or pick-up coil mounted on the downrigger boom. The problem is that the signal level is so small, prior art systems are not able to discern the information the signal contains. Hence, the system stops operating.

There are several improvements needed in the system to solve this technical issue. The first area discussed will be that of the antenna or pick-up coil.

Yet another object of the present invention is to provide an improved antenna. Those skilled in the art of electronics understand that as a varying current passes through a first wire it generates a small varying magnetic field about the first wire. This varying magnetic field will induce a small varying current into a second wire if the second wire is in close proximity to the first wire. This induced varying current in the second wire will create a varying voltage as measured at the second wire based on the impedance of the second wire and the impedance of the circuitry attached to the second wire. However, if the second wire were to completely surround the first wire in the form of multiple turns, the varying voltage induced in the second wire is larger that if the second wire had no turns at all.

This concept is used on existing systems by means of an air wound spring that is used as a receiving antenna or 'pick-up coil' antenna. The coated downrigger cable is routed through the center of the pick-up coil for best reception. Existing systems use springs or pick-up coils of only 10-35 turns.

Due to the pick-up coil being wound from bare wire, each turn has to be spaced apart from the previous turn to prevent electrical contact between the turns or windings. With existing systems, the spring length is usually limited to approximately 3".

Method #1:

By simply manufacturing the pick-up coil to a longer length, say 4" or more, and maintaining the same turn-to-turn spacing, it is easy to understand that new pick-up coil would have more turns. More turns equate to more recovered signal. Using this analogy, a pick-up coil of 15" in length would of course recover more signal than a pick-up coil of 2". Therefore, simply increasing the number of turns and hence the length of the pick-up coil will recover more signal than that of a shorter pick-up coil.

Method #2:

Unfortunately method #1 has practical limits since the available space on a downrigger boom is limited and mounting would become a problem.

An alternate method to increase the winding count is to use smaller gauge wire with an electrical isolation on its exterior. This isolation is typically an enamel or lacquer coating (i.e. magnet wire) or it could be a plastic coating such as PVC. Now the pick-up coil can be wound with each turn touching the previous turn while each turn is still electrically isolated from the adjacent turns. With this approach, it is easy to see that a pick-up coil of 3" of length could have 4 or more times the turns of an air wound coil constructed of bare wire. Now, because the wire is of smaller diameter, it usually won't keep its form properly and its thin electrical coating is easily damaged. However, winding this type of pick-up coil on a plastic bobbin with a hole through the center such that the downrigger cable could pass through solves the problem. The bobbin is used to maintain the form of the coil as well as protect the coil windings and thin insulation from the downrigger cable that is passing through the center of the coil. Additionally, because this type of wire is more fragile, the complete assembly of turns of wire on the bobbin would need to be enclosed or encapsulated in a material such as plastic or epoxy to prevent damage and corrosion to the wires.

Method #3:

While method #2 allows many more turns in the same length required for an air would coil, the turn count may not be adequate for the task at hand. Therefore, the insulated wire could be wound onto the bobbin in multiple layers, the second layer of windings directly on top of the first layer, the third layer wound directly on top of the second layer, and so on. With this approach, a much larger turn count pick-up coil can be constructed in a similar space as required for present air wound bare wire coils. With this layered winding approach, a much higher signal level would be recovered from the downrigger cable as compared to the air wound bare wire coil as used in existing systems. Of course this assembly would also require protection from mechanical damage and corrosion so the same type of enclosure or potting method would be employed.

Method #4:

While methods #2 & #3 are practical to recover larger amounts of signal from the downrigger cable, another alternative exists to increase the effectiveness of the antenna. This is referred to as an active antenna. Essentially, the pick-up coil as described in method #2 & #3 would be mounted in conjunction with a small circuit board that includes the receiving circuitry. With the receiving circuitry in very close proximity to the pick-up antenna, maximum signal is recovered from the downrigger cable and cabling signal loss from the antenna to receiver/display unit is overcome. Active antennas usually include a preamplifier, and can also contain front-end tuned circuits as well as inter-stage ceramic filters or crystal filters to greatly increase the selectivity of the circuit while increase the rejection of unwanted signals. Power for the active antenna module would be provided in the cable connected to the receiver/display module or by means of direct wired connection to boat DC power.

Still another object of the present invention to provide improved receiver sensitivity. We have learned how to recover a stronger signal by means of antenna improvements. By improving the receiver circuitry the receiver sensitivity can also be improved. Increasing the receiver sensitivity allows the receiver to receive and recover data from signals that are too low in level to be recovered by prior art systems.

The first method to increase the receiver sensitivity is to increase the receiver's selectivity. Selectivity is a measure of how well a receiver receives a specific frequency while rejecting unwanted frequencies. This equates to narrowing the bandwidth of the receiver and providing much steeper roll-off of frequencies outside the desired bandwidth. Since the underwater probe modulates its data onto a single frequency carrier or about a single frequency carrier as in the case of frequency shift key (FSK) modulation, it is possible to narrow the bandwidth of the receiver such that it only receives signals of a specific frequency. The probe may employ amplitude shift key (ASK) modulation, frequency shift key (FSK) modulation or both amplitude shift key and frequency shift key modulation. Prior art systems employ bandwidth limiting circuitry in the form of a tuned LC circuit. Unfortunately, tuned LC circuits do not provide the selectivity or narrow bandwidths needed to recover the low level signals that are present when a downrigger cable has no insulation or coating. Additionally, LC tuned circuits do not have a steep roll-off or attenuation of frequencies outside the desired bandwidth. While a tuned LC circuit may still be employed as a first stage of the receiver, a better method to improve the receiver's selectivity is to employ a ceramic filter or crystal filter network. These types of inter-stage filters are employed in many communication systems such as two-way radios, AM and FM receivers and the like as they provide a much narrower bandwidth than can be, obtained by a simple LC filter. Narrower bandwidth equals improved receiver sensitivity. Additionally, the out-of-band rejection of these types of filters is much greater than that of a LC tuned circuit thereby eliminating interference noise from sources such as two-way radios, radar, livewell pump motors, fan motors and the like wherein said noise signals reside in close proximity to said carrier frequency of received probe transmissions.

The second method to increasing the effective sensitivity of the receiver is to employ automatic gain control (AGC) circuitry or automatic level control (ALC) circuitry. This circuitry is constantly monitoring the output of the amplifier or amplifiers in the receive circuitry and dynamically adjusts the gain of the amplifier(s) to maintain a relatively constant output signal level. If a strong signal is received from the antenna, the AGC or ALC circuit will dynamically reduce the gain of the amplifier to maintain a relatively constant amplitude which prevents overdriving the next stage in the receiver. Conversely, if a very weak signal is received from the antenna, the AGC or ALC circuit will dynamically increase the amplifier gain until the amplifier's output is at a desirable level. This type of circuitry is very important in the recovery of digitally modulated signals that have a wide range of signal levels. As an example, when a system as described does not use a coated downrigger cable, when the underwater probe is at 200 feet depths of water the signal level recovered at the pick-up coil antenna might be measured in microvolts.

Conversely, when the underwater probe is only at 10 foot depths, the voltage level recovered at the pick-up coil antenna might be measured in a volt or more. To handle this wide range of signal levels, a receiver must employ AGC or ALC circuits.

Underwater Sensor/Transmitter Probe Operational Description

The probe circuitry is in an ultra-low current sleep mode when out of the water to conserve battery power. When the probe is placed in water, the probe water sensing circuitry senses or measures current flow across two water sensing elements, or across one sensing element and the second connection tab, if that tab is tied electrically to ground. When current flow is detected, the internal circuitry enters run mode. The probe circuitry may include at least one electrically conductive element penetrating the housing forming means for sensing the presence or absence of water. The means may measure resistance between an electrically conductive element and another electrically conductive circuit element. The means may measure resistance between and electrically conductive element and circuit ground. The means may measure current between an electrically conductive element and another electrically conductive circuit element. The means may measure current between an electrically conductive element and circuit ground. When in ultra-low current sleep mode less than 200 uA of current is consumed. The average current consumption is less than 1.75 mA.

As the probe moves in the water, the ferromagnetic rotor starts to rotate. This rotational speed is correlatable to MPH through software algorithms. As the ferromagnetic rotor rotates, each of its teeth pass by a magnetic field sensor such as a hall-effect sensor. The hall-effect sensor has internal chopper circuitry thereby greatly reducing its average current consumption. As each tooth passes by the magnetic sensor, the magnetic sensor creates a digital pulse. The microcontroller counts these pulses over a specific period of time and stores this data until it is time to transmit an RF message up the downrigger cable. Alternately; the microcontroller may measure the time between each pulse, then average this data over multiple measured durations, and store the averaged data until it is time to transmit an RF message up the downrigger cable.

Additionally, the microcontroller is periodically communicating with the temperature sensor to extract temperature data. This temperature data is extracted then stored until it is time to transmit an RF message up the downrigger cable. The microcontroller may average several samples of data and store the average data.

Additionally, the microcontroller is periodically measuring the probe's battery voltage and storing this data until it is time to transmit an RF message up the downrigger cable.

Periodically, the microcontroller collects the stored data, formulates a message and transmits this message up the downrigger cable by means of an RF driver circuit that is electrically connected to the first connection tab.

Optionally, the probe electronics may include a means to measure ambient light intensity and water pressure. Ambient light intensity is used by fisherman to help choose appropriate colors for lures as it is well known that light intensity continues to decrease as the depth of the lure is increased.

Water pressure as measured at the probe can be converted into actual depth via software algorithms.

The process of periodically collecting data, optionally averaging data, and periodically transmitting said data via an RF message transmission continues until the probe is removed from the water. When the water sensing circuitry in conjunction with the water sensing elements detects that the probe has been removed from the water, the probe electronics is placed in an ultra-low current sleep state to conserve battery power.

Underwater Sensor/Transmitter Probe Improvements

The various figures illustrate an under water sensor/transmitter probe design with many new features not available on prior art systems.

First, the probe housing is constructed of three pieces. The main body, the nose piece, and the battery access cover. The overall probe enclosure features a reverse taper i.e. the probe housing is physically larger at the front toward the nose than it is toward the back. The reverse taper aids in reducing hydrodynamic drag as well as greatly improves the produce-ability of the enclosure. The nose is fabricated in a separate piece to aid in assembly of the electronics internal to the unit. After the electronic assembly is installed, the nose piece is installed to complete the assembly.

The battery access cover installs to the main body by means of threads. The battery access cover features internal threads and the mating threads on the main body are external threads. This approach helps reduce overall size while greatly improving produce-ability. The battery access cover has provisions for an O-ring seal on the inside bottom of the cover. The O-ring seal mates with the bottom edge of the main body. The battery access cover also includes a spring and back-up washer fastened to the inside bottom of the cover by means of a screw, bolt or rivet. This spring presses against the battery and this pressure maintains the contact between the battery terminals and the fixed position power terminals (i.e. fixed position battery contacts) within the probe unit. The battery contacts are constructed from a material that resists corrosion, such as stainless steel or nickel plated brass. A second O-ring seal is located on the main body and this seal mates with the inside surface of the battery access cover. The main body is a housing that contains a gland for placement of the second O-ring seal, where the gland is located prior to the start of the external screw threads but after the end of the housing's outer surface is The battery access cover features aggressive knurled surface to aid users in removing and installing the cover when their hands may be wet and slippery.

The main body of the unit includes the rotor housing detail as well as provisions for the rotor axle. A rotor mounting detail is constructed at the same time as the main body.

The main housing contains slots or channels on its interior for alignment of the circuit board assembly.

The main housing and nose piece, when assembled, also include a raised boss that surrounds the upper connection tab. This boss aids in creating a good seal between the housing and applied rubberized electrical tape, necessary if used with coated downrigger cable.

The nose cap features an elliptical contour on the front to aid in reducing hydrodynamic drag.

Additionally, the main body of the probe may include stabilization fins to aid in the proper tracking of the probe unit with respect to the direction of the boat. Due to the ferromagnetic wheel protruding on one side of the probe, the probe may track at an angle (or dog track) to the boats direction of movement.

Circuit Board Assembly for Underwater Sensor/Transmitter Probe Unit.

The circuit board assembly is designed such that all electrical components, connecting tabs, and power contact terminals can be assembled prior to installation into the housing, then slideably installed into the slots or channels within the main body. Prior to installing the circuit board assembly, a battery alignment housing is slide-ably installed into the slots or channels. The battery alignment housing aids in positioning the battery to make proper contact with the power contact terminals on the circuit board assembly. Optionally, this battery alignment housing may be attached to the circuit board assembly, then the completed circuit board assembly including the battery alignment housing is slideably installed into the slots or channels within the main body.

Each connection tab (i.e. mounting tab) is fabricated with identical geometry to reduce tooling costs, piece part costs, and to reduce errors in assembly. They are installed with a series of shims and washers to sandwich the circuit board thus creating an electrical connection between the RF signal drive circuitry on the circuit board while electrically isolating the lower tab from the upper tab. The lower tab may include a terminal and wire that connects the lower tab to ground potential of the circuit board.

All the sensor devices such as the magnetic sensor device and the temperature sensing device are mounted directly to the circuit board. The sensors are located directly below the axis of rotation of the ferromagnetic rotor. The circuitry has provisions to protect itself from damage should the power be installed in a reverse-polarity manner.

Receiver/Display Functional Overview:

The receiver/display unit is comprised of the following major components:

An enclosure, a multiple button keypad with integral seal for the enclosure, a keypad backlight, a circuit board assembly consisting of a regulator circuit, microcontroller, an LCD, a LCD backlight, circuitry to receive the signal from the antenna and convert said signal into digital data, a DC power connector, and a signal input connector. It should be noted that the two connectors could be combined into a single connector without varying from the theme of the disclosed invention.

To turn on the receiver/display unit, the user presses the ON button for a short period of time. Once the unit is operating, it continues to monitor the signal input line for data coming from the underwater sensor/transmitter probe unit. When a signal is detected, the signal receive circuitry converts this signal into digital data for processing by the microcontroller. The microcontroller then decodes this data and displays the data on the LCD.

The signal receive circuitry includes a ceramic filter or crystal filter to provide a high degree of selectivity and thus improve sensitivity to low-level input signals. Additionally, this signal receive circuitry also includes an automatic gain control circuit (sometimes referred to as automatic level control) that dynamically adjusts the gain of an amplifier or amplifiers such that the output signal level is maintained at a desired level.

The receiver/display unit also includes features to allow users to calibrate various parameters and displayed data. As an example, a user may notice that receiver/display unit's data does not match that of his other instrument for measuring surface speed and temperature. The user can enter a wide variety of calibration modes by pressing a specific button, a specific series of buttons or a specific combination of buttons.

Once a specific calibration mode is entered, the CAL icon will illuminate on the display to indicate the receiver/display system is in the calibration mode. If the user had chosen to calibrate the speed function, he would have pressed the appropriate buttons to enter the speed calibration mode. To adjust the reading on the display, the user would simply press another button such as the up or down arrow button to adjust the display in specific increments per button press. Say 0.1 MPH per button press as an example. This same process could be followed to calibrate the temperature display function as well.

Additionally, the user can calibrate the low battery indicator threshold. This threshold determines when the low battery warning icon would be activated. Remember, the low battery icon indicates the battery in the underwater sensor/transmitter probe is low. Again, the user would press a specific button, a specific series of buttons or a specific combination of buttons to enter the 'low battery warning threshold' calibration mode. Once in calibration mode, the CAL icon would be activated. Now the current low battery warning threshold would be displayed on the LCD. The user would simply press a button such as the up or down arrow to adjust this threshold to a new value.

Yet another calibratable feature is available to the user. This calibration is for the data averaging setting. Data averaging is used to smooth out dynamic changes in data from one received transmission to the next. To explain a bit further, let's think about what happens to an underwater probe when it is connected to a watercraft via a rigid downrigger cable. Now let's also assume the boat is bouncing around in 4 or 6 foot waves. As the boat bounces up and down, the downrigger cable will also pull the probe up and down in the water column the same distance as the boat is bouncing. This action can adversely affect the readings of speed from one moment to the next. If the readings were taken every second for example, one reading might show 2 MPH, the next might show 4 MPH, and the next might show 0 MPH. These quick changes in speed are due to the effects of wave action on the ferromagnetic rotor's RPM. If the data averaging setting was only set to 1 second, the user may think something is wrong with the system when its being used in wavy water conditions. The user may notice the readings for speed jumping all over the place. To eliminate this problem, the receiver uses data averaging to smooth out these varying readings. If the data averaging was set a 5, the receiver/display unit would average the data over 5 consecutive received sensed data, then display the average of this data. The disclosed invention allows the user to calibrate the data averaging by means of entering a calibration mode.

Again, the user would press a specific button, a specific series of buttons or a specific combination of buttons to enter the 'data averaging' calibration mode. Once in calibration mode, the CAL icon would be activated. Now the current data averaging is displayed on the LCD. The user would simply press a button such as the up or down arrow to adjust this averaging to a new value. As an example, each press of the up or down button may change the data averaging setting by 1 sample.

The receiver/display unit also provides a means to exit the calibration mode. To exit any of the calibration modes, the user would press a specific button, a specific series of buttons or a specific combination of buttons. Once the calibration mode is exited, the CAL icon is turned off.

BRIEF DESCRIPTION OF THE DRAWING FIGURES

DESCRIPTION OF REFERENCED NUMERALS

Figure 1:
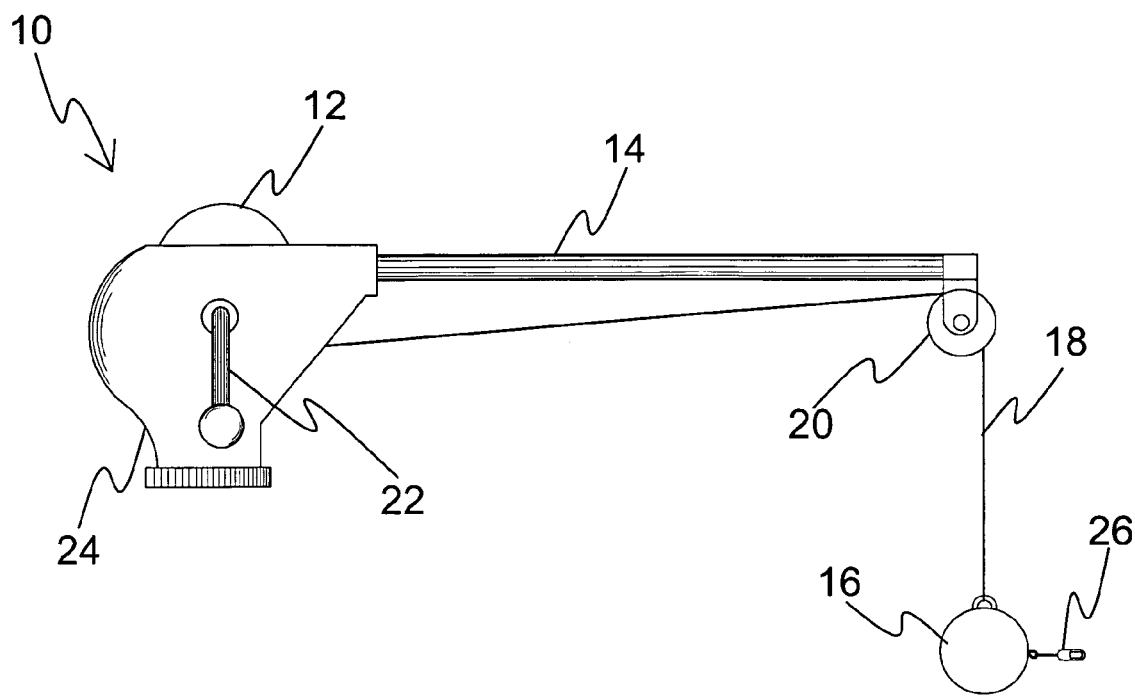
FIG. 1 is a side view of a typical downrigger.

10 Downrigger
12 Reel
14 Boom
16 Cannonball Weight
18 Downrigger Cable
20 Pulley
22 Crank Handle
24 Downrigger Frame
26 Fishing Line Release
28 Water Surface
30 Watercraft
32 Rod Holder
34 Fishing Rod & Reel
36 Fishing Line
38 Fishing Lure
40 Trolling Direction
42 Fish
44 Coated Downrigger Cable
46 Underwater Sensor/Transmitter Probe Unit
48 Receiver/Display Unit
50 Antenna Assembly
52 Signal Pick-Up Coil
54 Antenna Cable
56 DC Power Cable with In-Line Fuse
58 Antenna-to-Receiver Interface Cable
60 Coated Downrigger Cable with Coating Removed
62 Barrel Crimp
64 Thimble
66 Rubberized Electrical Tape
68 Plastic Tie Wraps
70 Cable Connector
76 Drop Leader
78 Nose Cap
80 First Connection Tab
82 Second Connection Tab
84 Main Body
86 Battery Access Cover
88 Ferromagnetic Rotor
90 Rotor Axle
92 Raised Flange
94 Circuit Board Assembly
96 Battery Alignment Housing
98 External Threads
100 Internal Threads
102 Back-up Washer
104 Battery Retention Spring
106 First O-Ring Gland
108 Second O-Ring Gland
110 First Power Contact
112 Second Power Contact
114 Water Sensing Element
116 First Isolator
118 Second Isolator
120 Circuit Board
122 Shim Washer
124 Circuit Board Alignment Channel
126 Battery Access Cover Assembly
128 Fastening Screw
130 Bobbin
132 Through-hole
134 Bobbin Assembly
136 Insulated Wire
138 Active Antenna Module Assembly
140 Antenna Module Circuit Board
142 Multi-Conductor Cable
144 Antenna Module Complete Assembly
146 Antenna Enclosure
148 Mounting Provisions
150 Active Antenna Module Complete Assembly
152 Active Antenna Module Enclosure
154 Mounting Springs
156 Mounting Adapter
158 LCD Display
160 7-Segment Digits
162 LO BAT icon
164 calibration mode icon
166 Temperature icon
168 Speed icon
170 First Pushbutton
172 Second Pushbutton
174 Third Pushbutton
176 Fourth Pushbutton
178 Receiver/Display enclosure
180 Separator icon
182 Optional Stabilization Fins
184 Temperature Sensor
186 Magnetic Field Sensor
188 Signal Conditioning Circuit
190 Micro-Controller
192 Regulator
194 Auxiliary Power Switch
196 Diode
198 RF Final Drive Amp
200 Power Jack
202 Micro-Controller of 48
204 Test Points
206 Diode Clipper
208 Signal Jack
210 LC Tuned Circuit
212 First Amp of 48
214 Second Amp of 48
216 Ceramic or Crystal Filter
218 Data Slicer Circuit
220 Keypad
222 Connector to Active Antenna Module The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is a side view of a typical downrigger 10 having a frame 24 for housing a reel 12 and its associated crank handle 22. A boom 14 extends from the frame 22 and a pulley 20 is disposed on the distal end of the boom 14 for guiding the downrigger cable 18 that is wound around the reel 12 and has a cannonball weight 16 fastened to the distal end thereof. A fishing line release 26 is secured to the cannonball 16.

Figure 2:
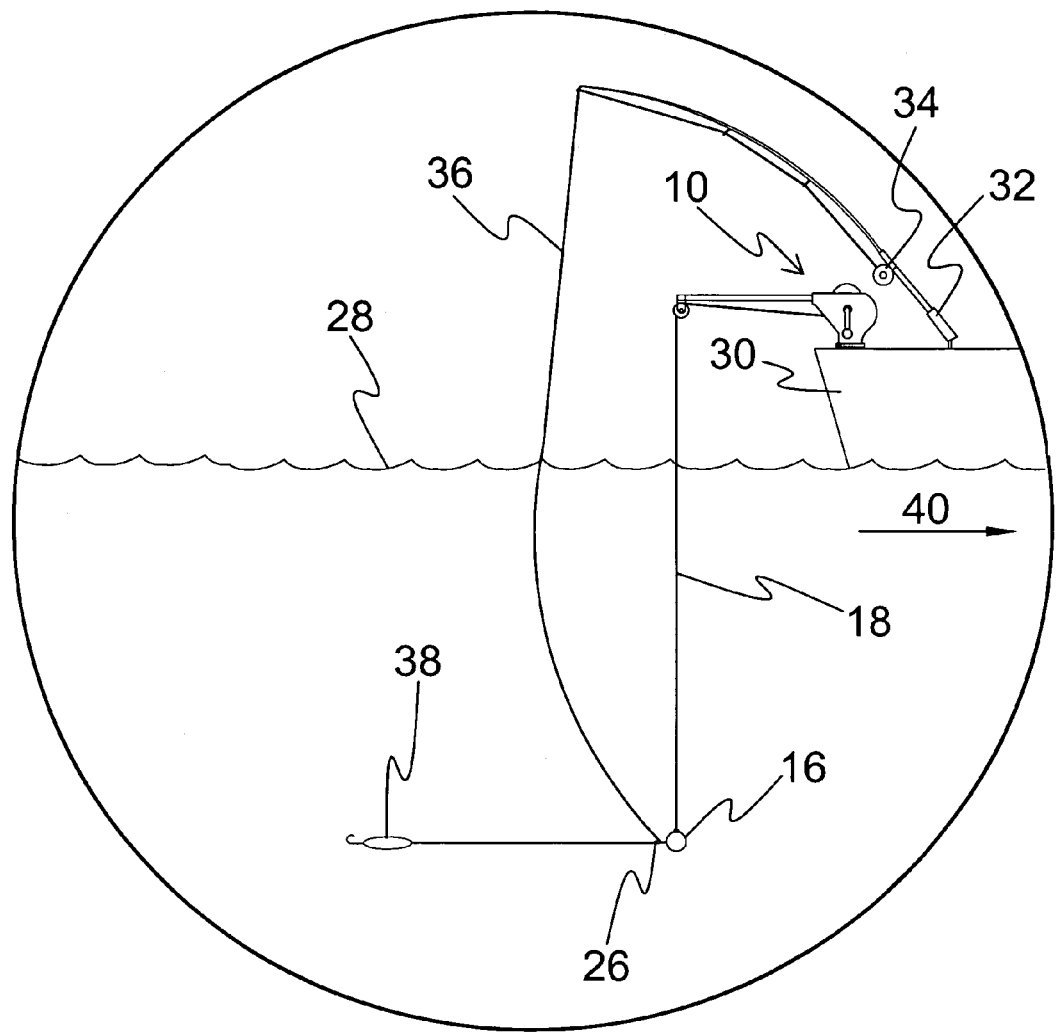
FIG. 2 is a side view of a controlled depth fishing set-up.

FIG. 2 is a side view of a typical controlled depth fishing set-up using a downrigger 10. Shown is a fishing rod and reel 34 inserted in a rod holder 32 attached to the watercraft 30 and its fishing line 36 is connected to the fishing line release 26 of the cannonball weight 16 and has a fishing lure 38 secured to the end thereof. The cannonball weight 16 has been lowered to a predetermined depth below the water surface 28 by the downrigger cable 18. The trolling direction 40 of the watercraft 30 will be moving away from the cannonball 16.

Figure 3:
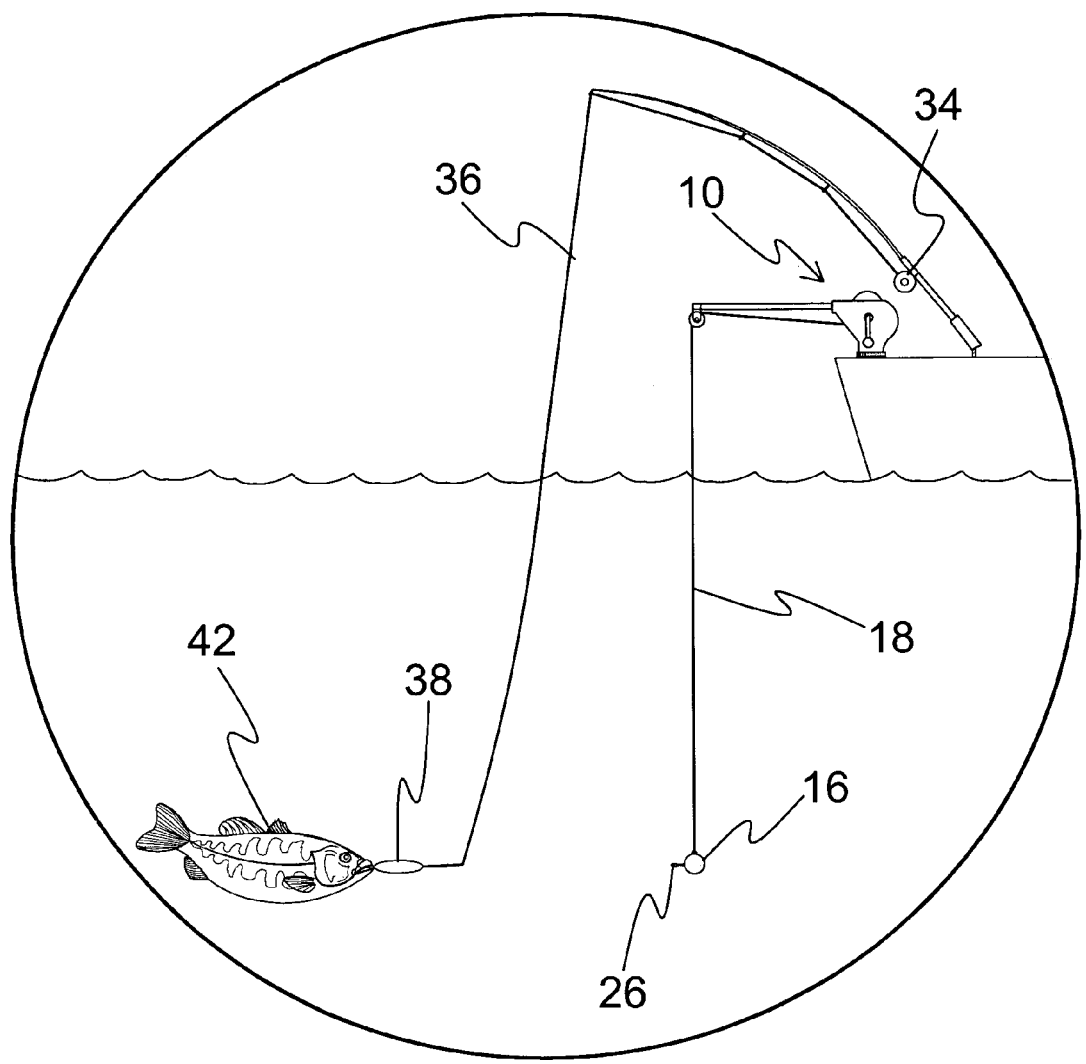
FIG. 3 is a side view of a controlled depth fishing set-up immediately after a fish strikes.

FIG. 3 is a side view of a typical controlled depth fishing set-up immediately after a fish 42 strikes. The fish 42 has been hooked by the lure 38 and the fishing line 36 has been freed from the cannonball weight 16 by the fishing line release 26. The fishing line 36 is now exclusively controlled by the rod and reel 34.

Figure 4:
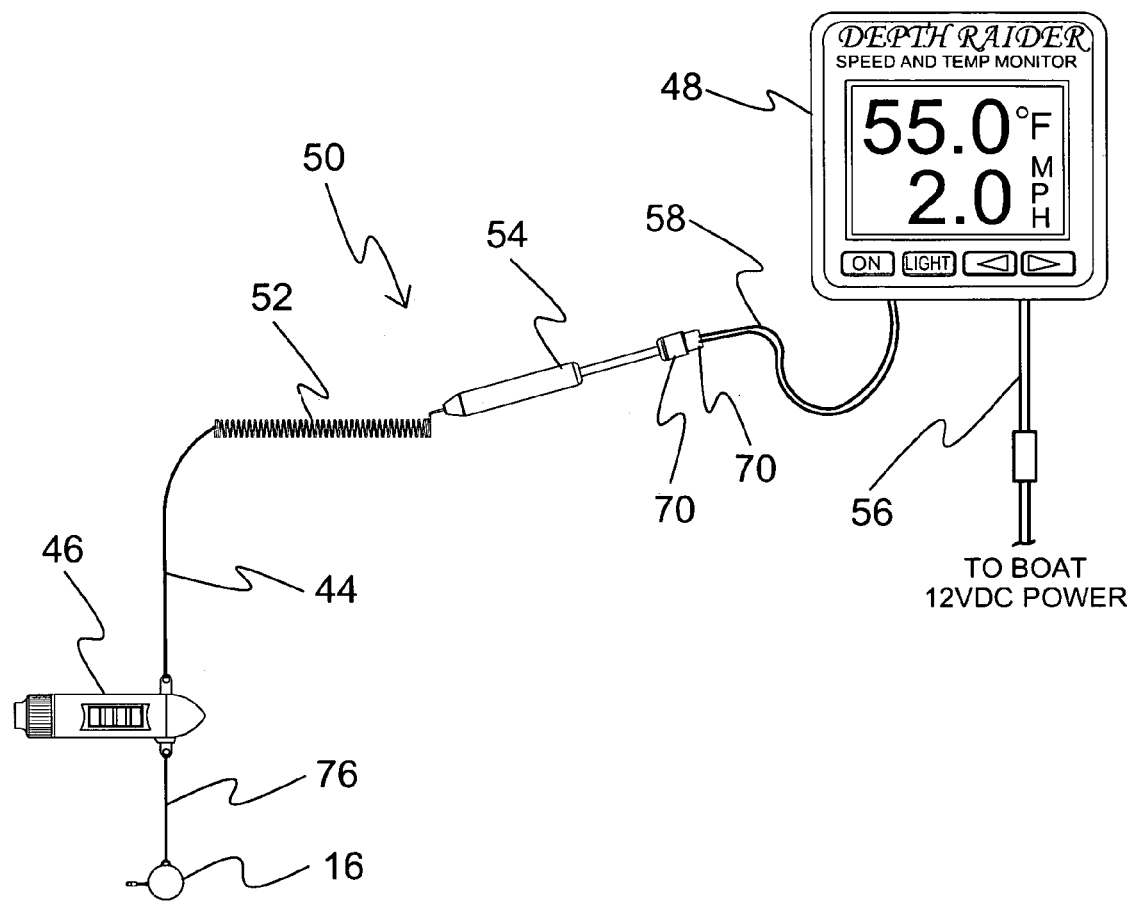
FIG. 4 illustrates the main components of a controlled depth speed and temperature monitoring system.

FIG. 4 illustrates the main components of the controlled depth speed and temperature monitoring system of the present invention. Shown is the underwater sensor and transmission probe 46 secured on top to a coated downrigger cable 44 and on the bottom to a drop leader 76 that is secured to the cannonball weight 16. The downrigger cable 44 passes through a signal pick-up coil 52 which is integral with an antenna assembly 50 that includes an antenna cable 54 and cable connectors 70 attached to an antenna to receiver interface cable 58 which terminates at the receiver/display unit 48. The receiver/display unit 48 is connected to a 12 VDC battery with a DC power cable with in line fuse 56.

Figure 4A:
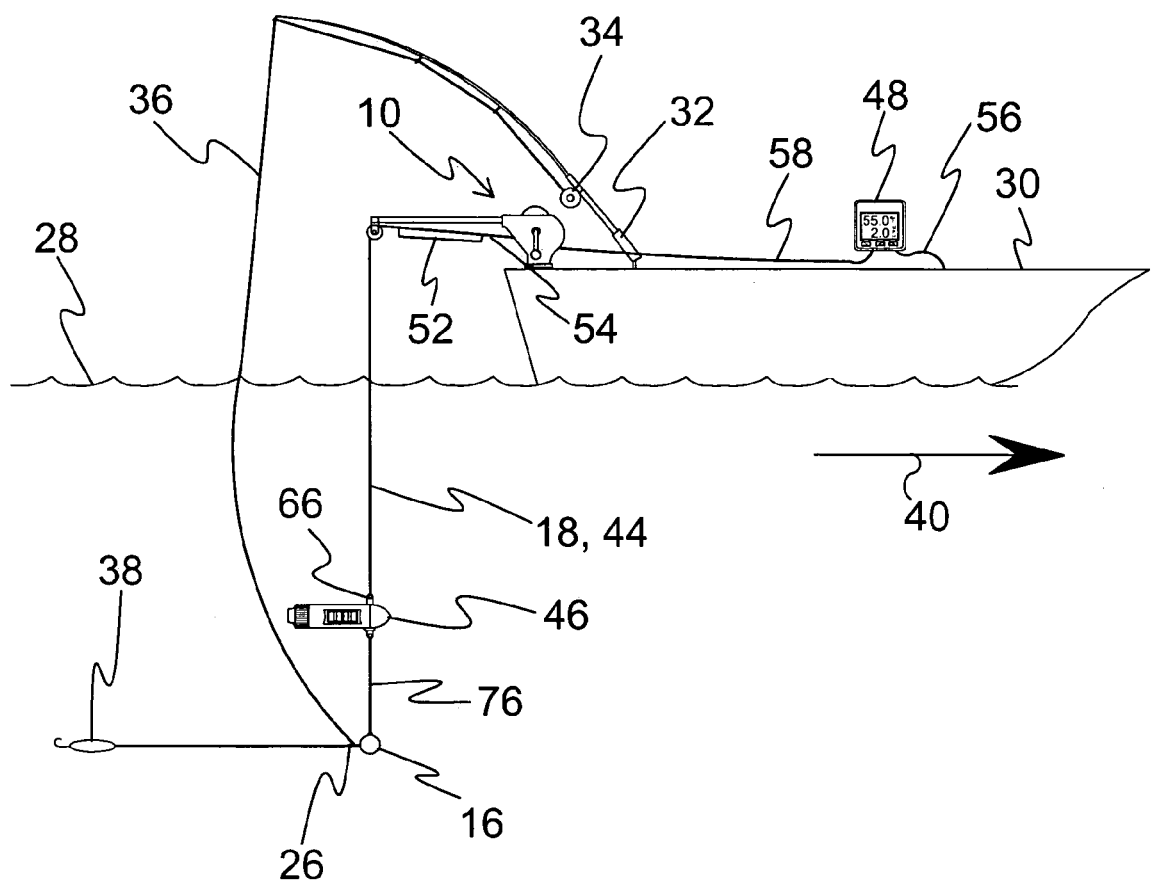
FIG. 4A illustrates a controlled depth fishing set-up when a speed and temperature monitoring system is installed.

FIG. 4A illustrates a controlled depth fishing set-up with the present invention installed. Shown is a fishing rod and reel 34 inserted in a rod holder 32 attached to the watercraft 30 and its fishing line 36 is connected to the fishing line release 26 of the cannonball weight 16 and has a fishing lure 38 secured to the end thereof. The cannonball weight 16 has been lowered to a predetermined depth below the water surface 28 by the downrigger cable 18,44 working in concert with a downrigger 10. The trolling direction 40 of the watercraft 30 will be moving away from the cannonball 16.

Figure 5:
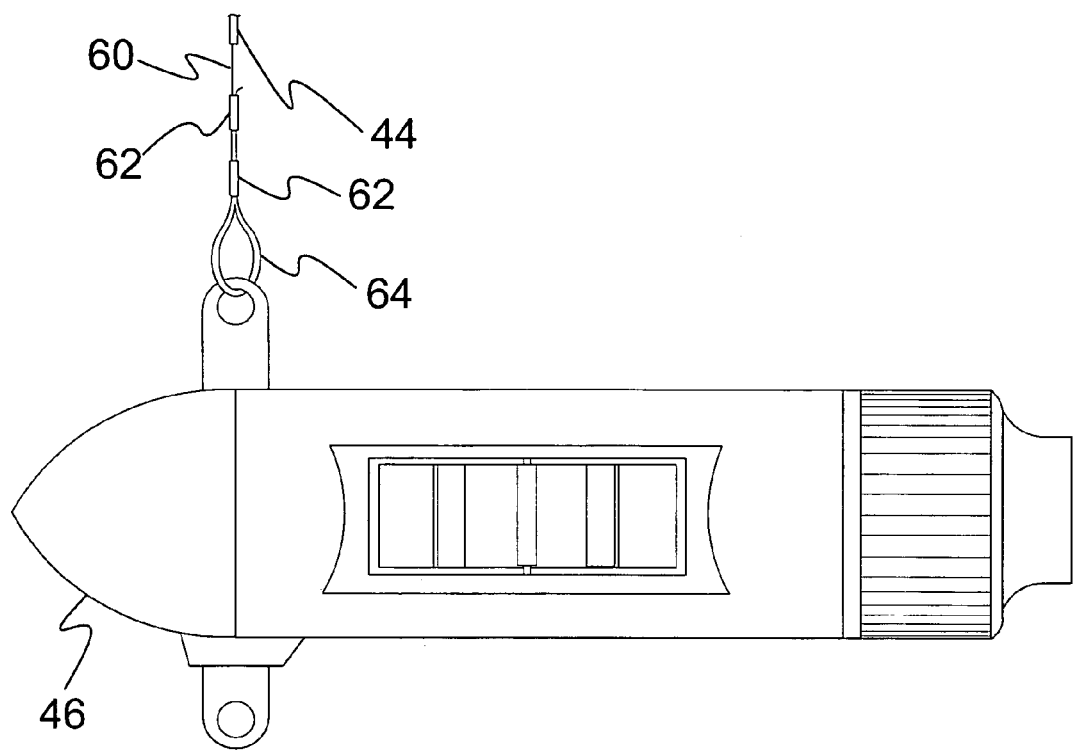
FIG. 5 is a side view illustration of the downrigger cable-to-underwater probe interconnect method.

FIG. 5 is a side view illustration of the downrigger cable 44 to underwater probe 46 interconnect method. Shown is the coated downrigger cable 44 with a section 60 having the coating removed. A thimble 64 forms a loop secured by a pair of barrel crimps 62.

Figure 6:
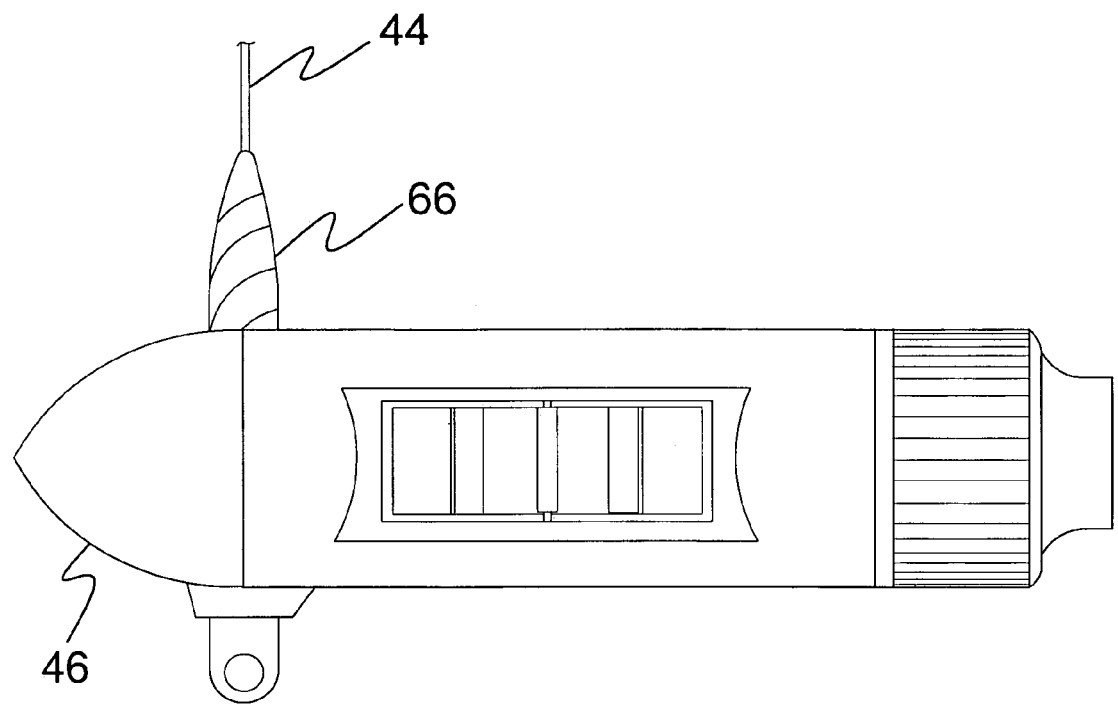
FIG. 6 is a side view illustration of the downrigger cable-to-underwater probe interconnect after applying rubberized electrical tape to isolate and seal the connection.
Figure 7:
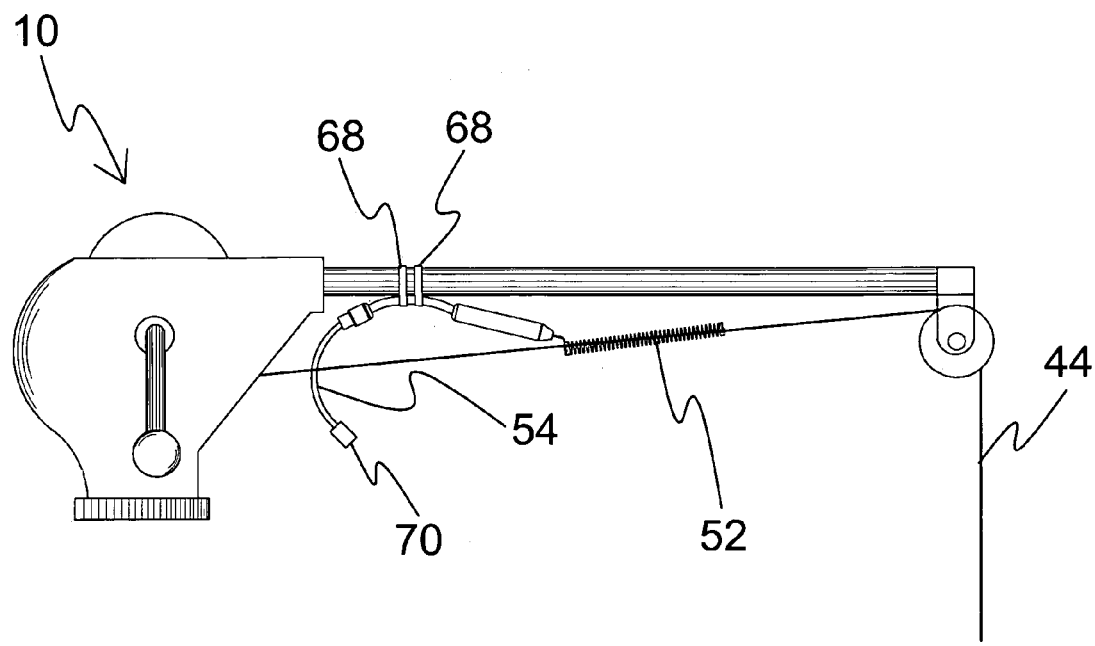
FIG. 7 is a side view of a downrigger illustrating the pick-up coil antenna installation.

FIG. 6 is a side view illustration of the downrigger cable 44 to underwater probe 46 interconnect after applying rubberized electrical tape 66 to isolate and seal the connection;

FIG. 7 is a side view of a downrigger 10 illustrating the pick-up coil 52 antenna installation. Shown is the downrigger cable 44 and extending through the center of the signal pick-up coil 52 leading to an antenna cable 54 and secured by a pair of plastic tie-wraps 68. A cable-connector 70 is disposed on the distal end of the antenna cable 54.

Figure 8:
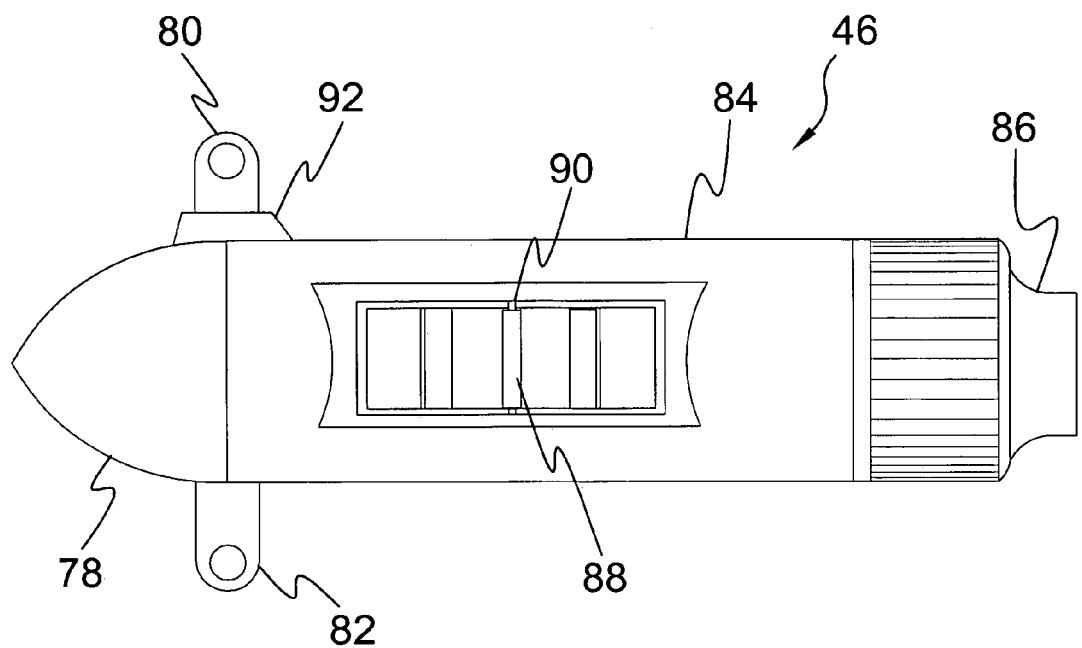
FIG. 8 is a side view of the underwater sensor/transmitter probe unit.

FIG. 8 is a side view of the underwater sensor/transmitter probe unit 46 demonstrating the physical relationship of the various components. The substantially cylindrical main body 84 has a nose cap 78 on the front end and a battery access cover 86 on the rear. A first connection tab 80 extends from a raised flange 92 on the top portion of the main body 84 proximal the nose cap 78 and an opposing second connection tab 82 is disposed on the bottom portion thereof. A ferromagnetic rotor 88 is interiorly disposed within the main body 84 and rotatively secured therein by a rotor axle 90.

Figure 9:
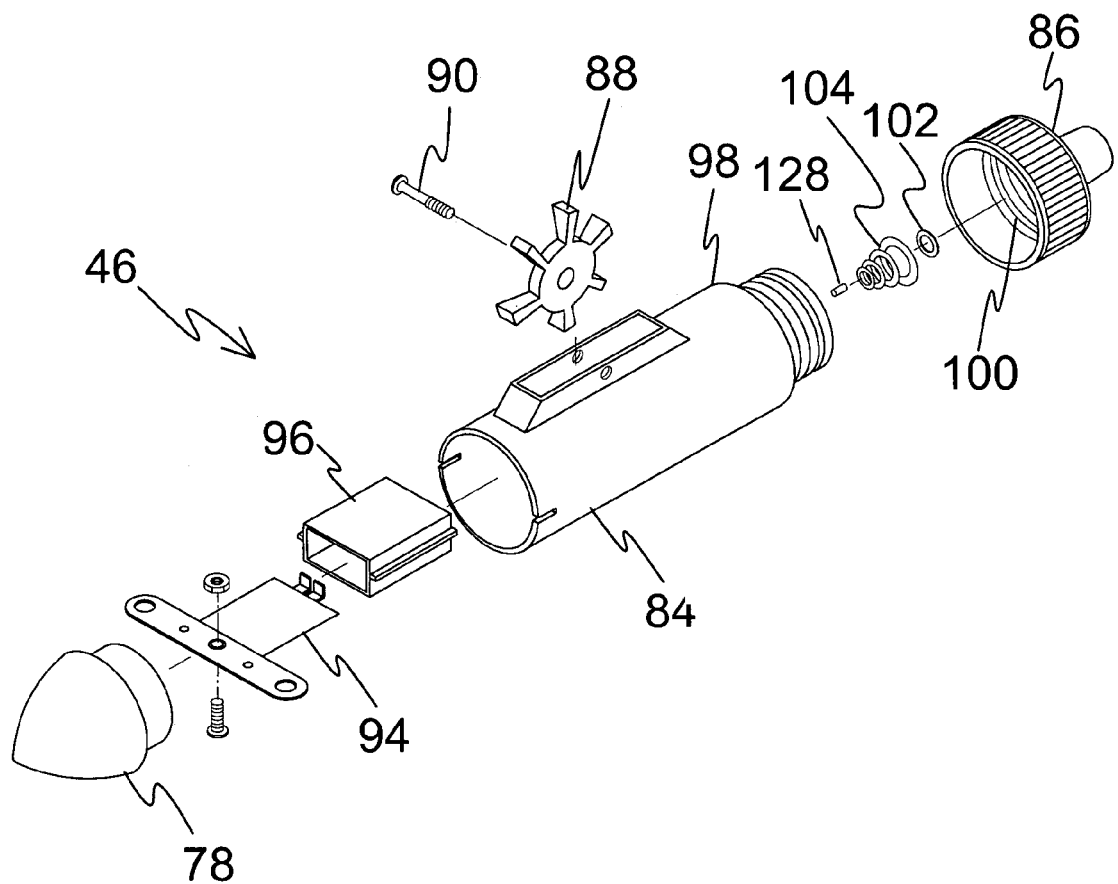
FIG. 9 is an exploded view of the underwater sensor/transmitter probe unit.

FIG. 9 is an exploded view of the underwater sensor/transmitter probe unit 46. The circuit board assembly 94 attaches to the battery alignment assembly 96 which in turn slides into the main body 84 and then covered by the nose cap 78. The ferromagnetic motor 88 extends beyond the main body 84 on one side and is retained therein by the rotor axle 90. A battery retention spring 104, back-up washer 102 and fastening screw 128 are positioned within the battery access cover 86. Internal threads 100 within the battery access cover 86 and mating external threads 98 on the main body 84 provide securing means therebetween.

Figure 10:
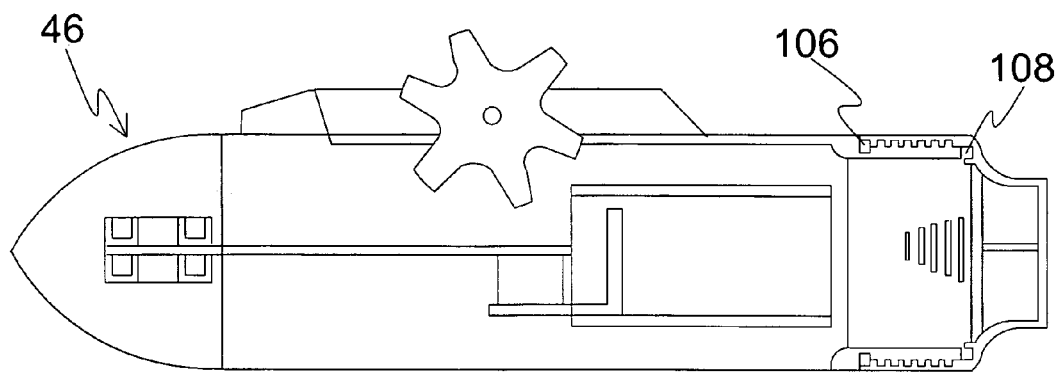
FIG. 10 is a cross-sectional view of the underwater sensor/transmitter probe unit.

FIG. 10 is a sectional view of the underwater sensor/transmitter probe unit 46 showing the position of the first o-ring gland 106 and the second o-ring gland 108.

Figure 11:
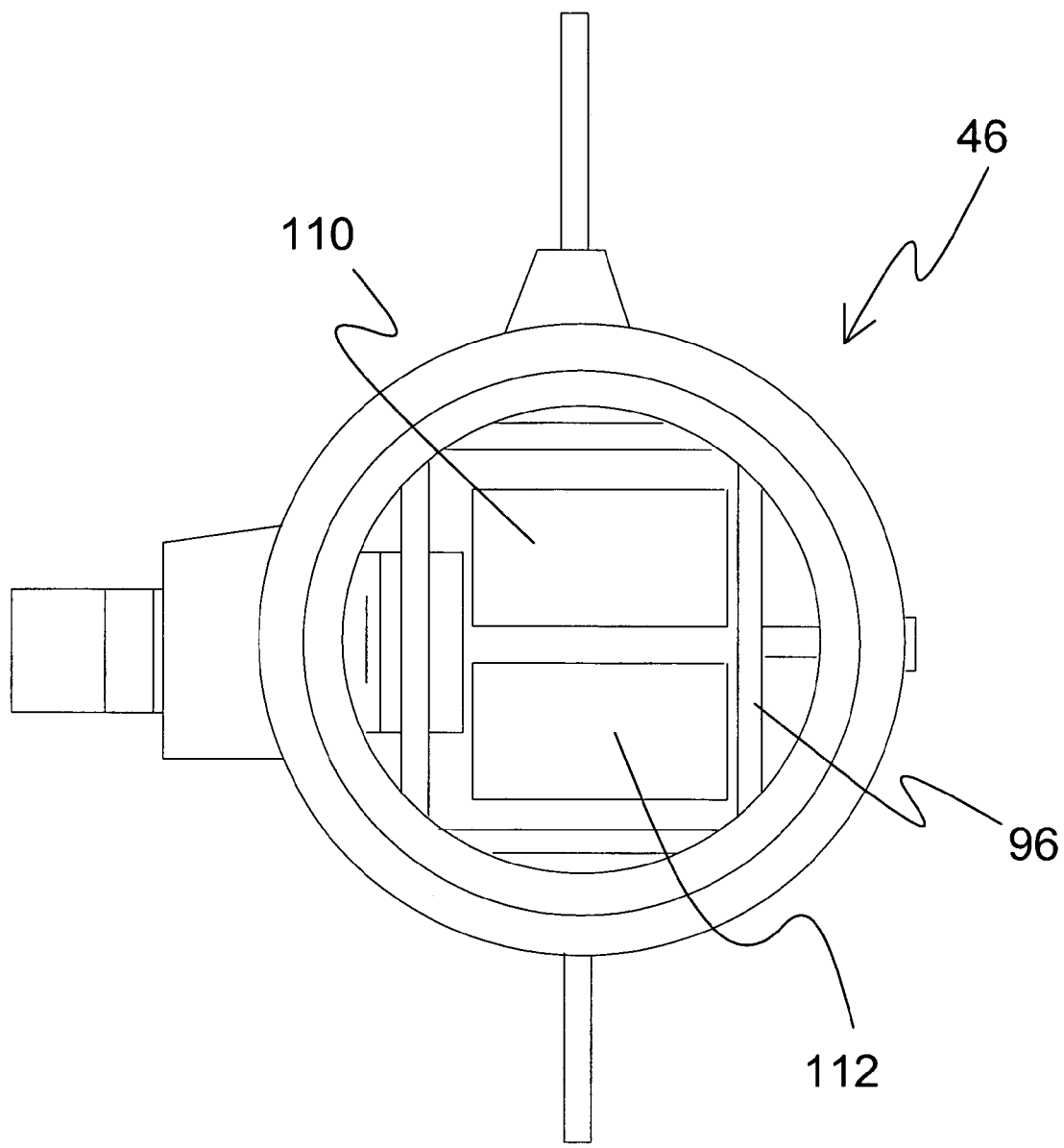
FIG. 11 is an end view of the underwater sensor/transmitter probe unit with battery access cover removed—looking into the battery compartment.

FIG. 11 is an end view of the underwater sensor/transmitter probe unit 46 with battery access cover removed to show the inside of the battery compartment to demonstrate the relationship between the first power contact 110, the second power contact 112 and the battery alignment housing 96.

Figure 12:
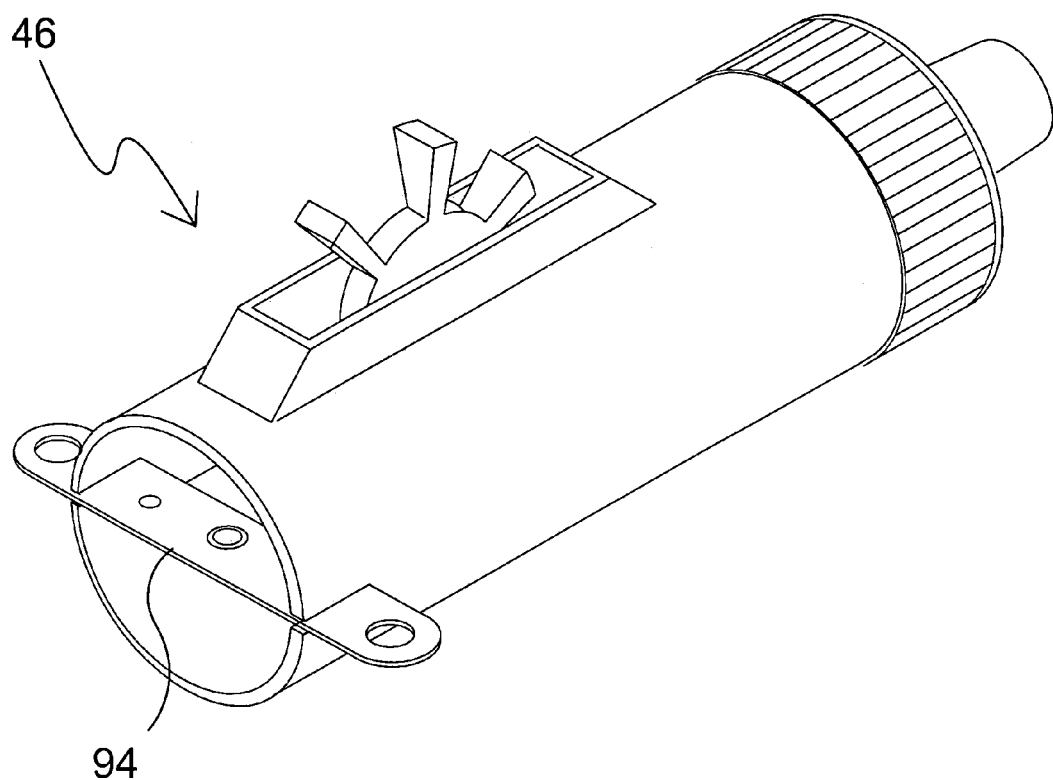
FIG. 12 is an angle view of the underwater sensor/transmitter probe unit with nose cap removed so as to see the circuit board assembly.

FIG. 12 is an angle view of the underwater sensor/transmitter probe unit 46 with nose cap removed so as to see the circuit board assembly 94.

Figure 13:
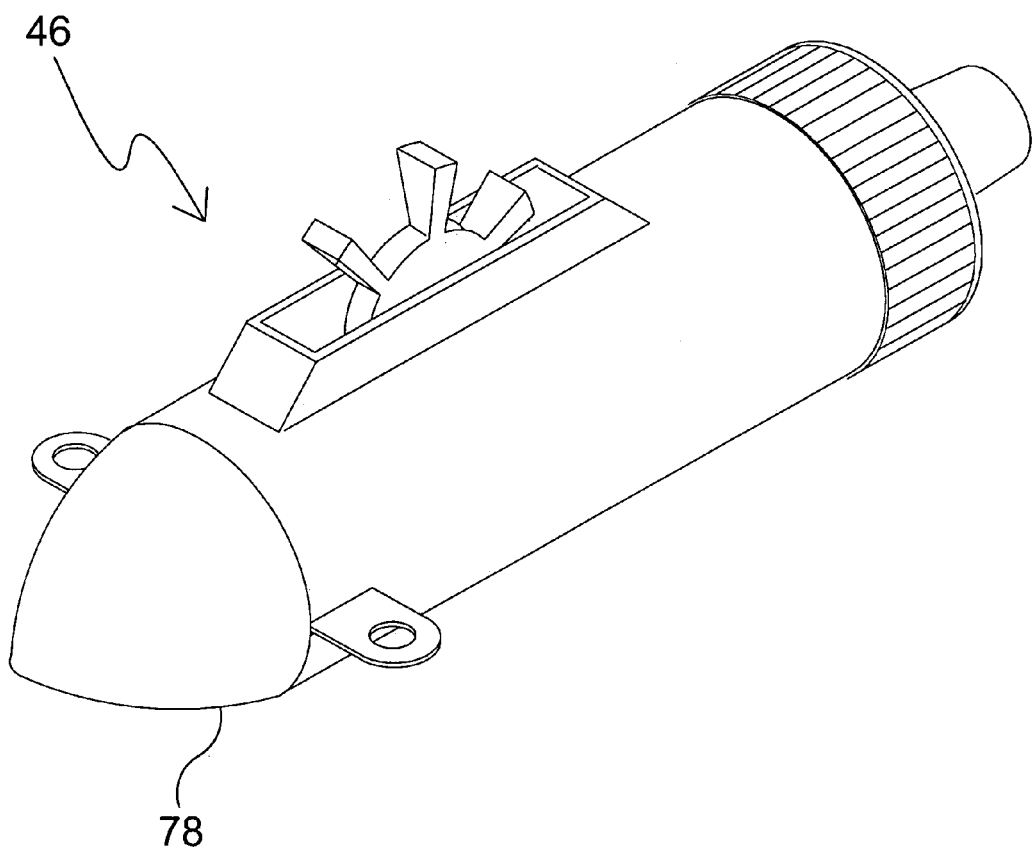
FIG. 13 is an angle view of the underwater sensor/transmitter probe unit.

FIG. 13 is an angle view of the underwater sensor/transmitter probe unit 46 with the nose cap 78 installed.

Figure 14:
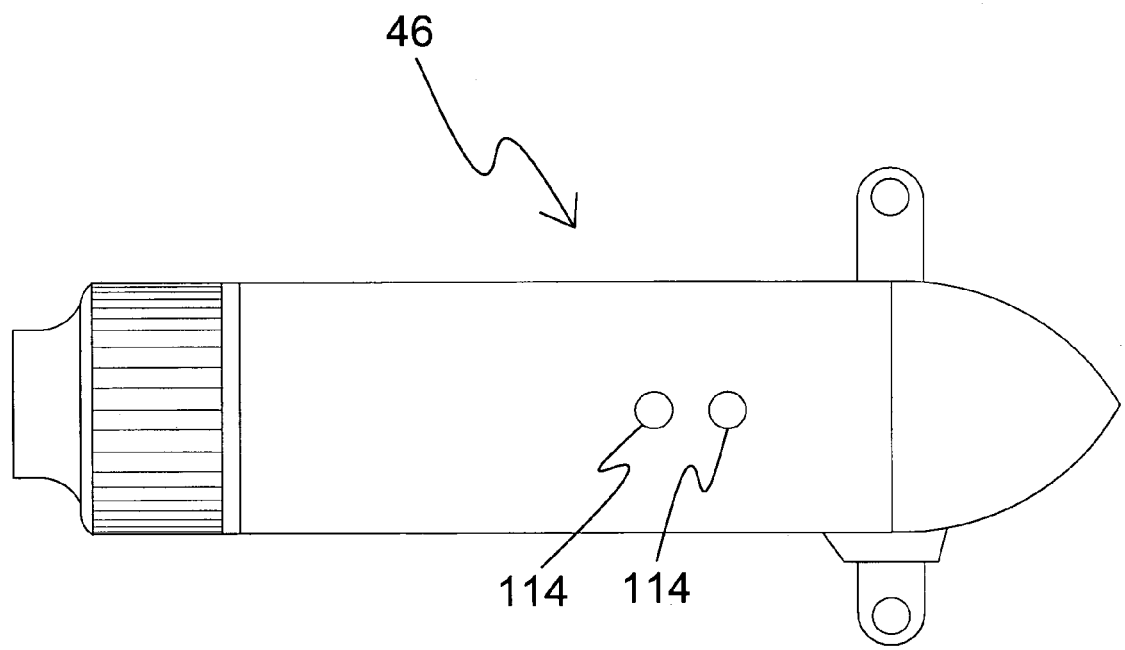
FIG. 14 is a back side view of the underwater sensor/transmitter probe unit.

FIG. 14 is a back side view of the underwater sensor/transmitter probe unit 46 showing the water sensing elements 114.

Figure 14A:
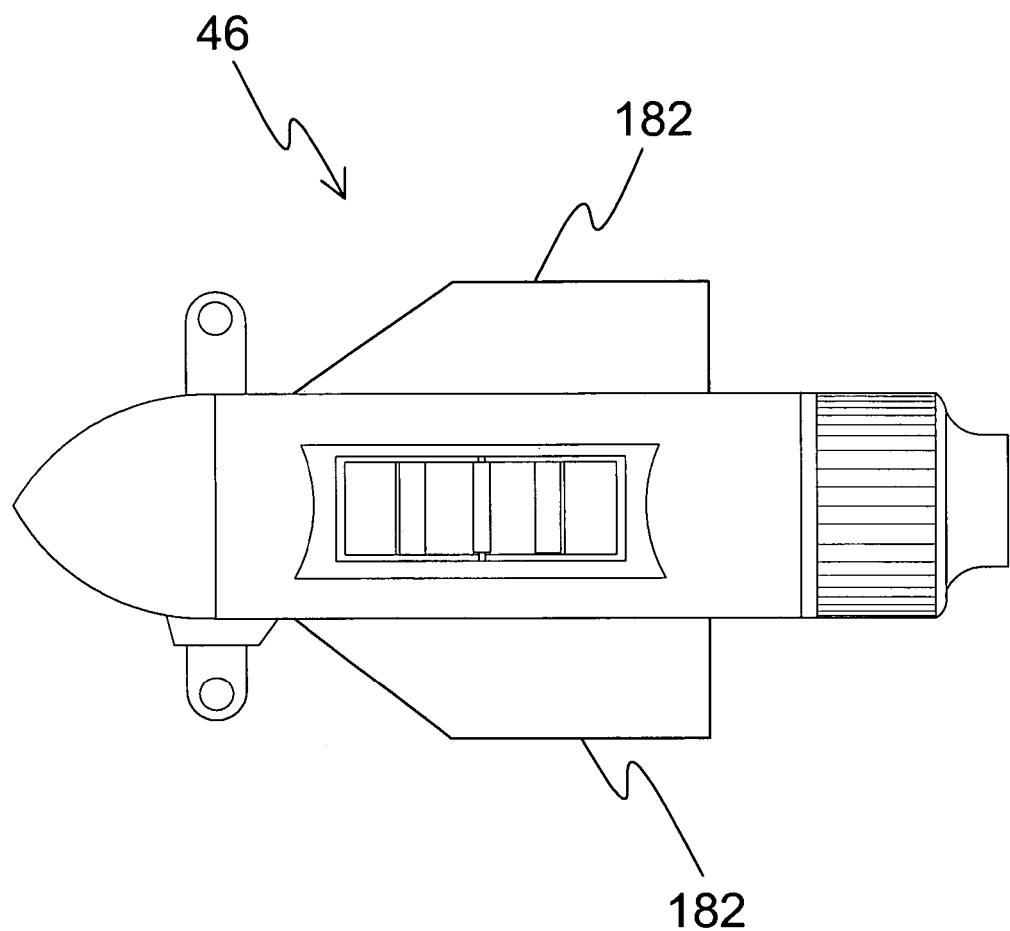
FIG. 14A is an angle view of the underwater sensor/transmitter probe unit with optional stabilization wings

FIG. 14A is an angle view of the underwater sensor/transmitter probe unit 46 with optional stabilization wings 182.

Figure 15:
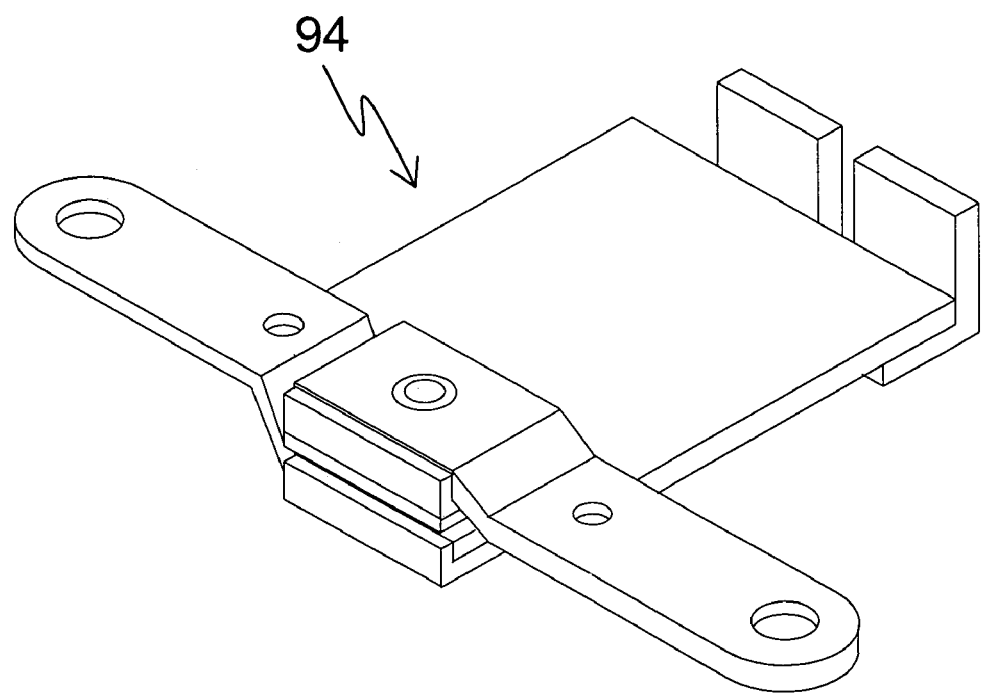
FIG. 15 is an angle view of the circuit board assembly of the underwater sensor/transmitter probe unit.

FIG. 15 is an angle view of the circuit board assembly 94 of the underwater sensor/transmitter probe unit.

Figure 16:
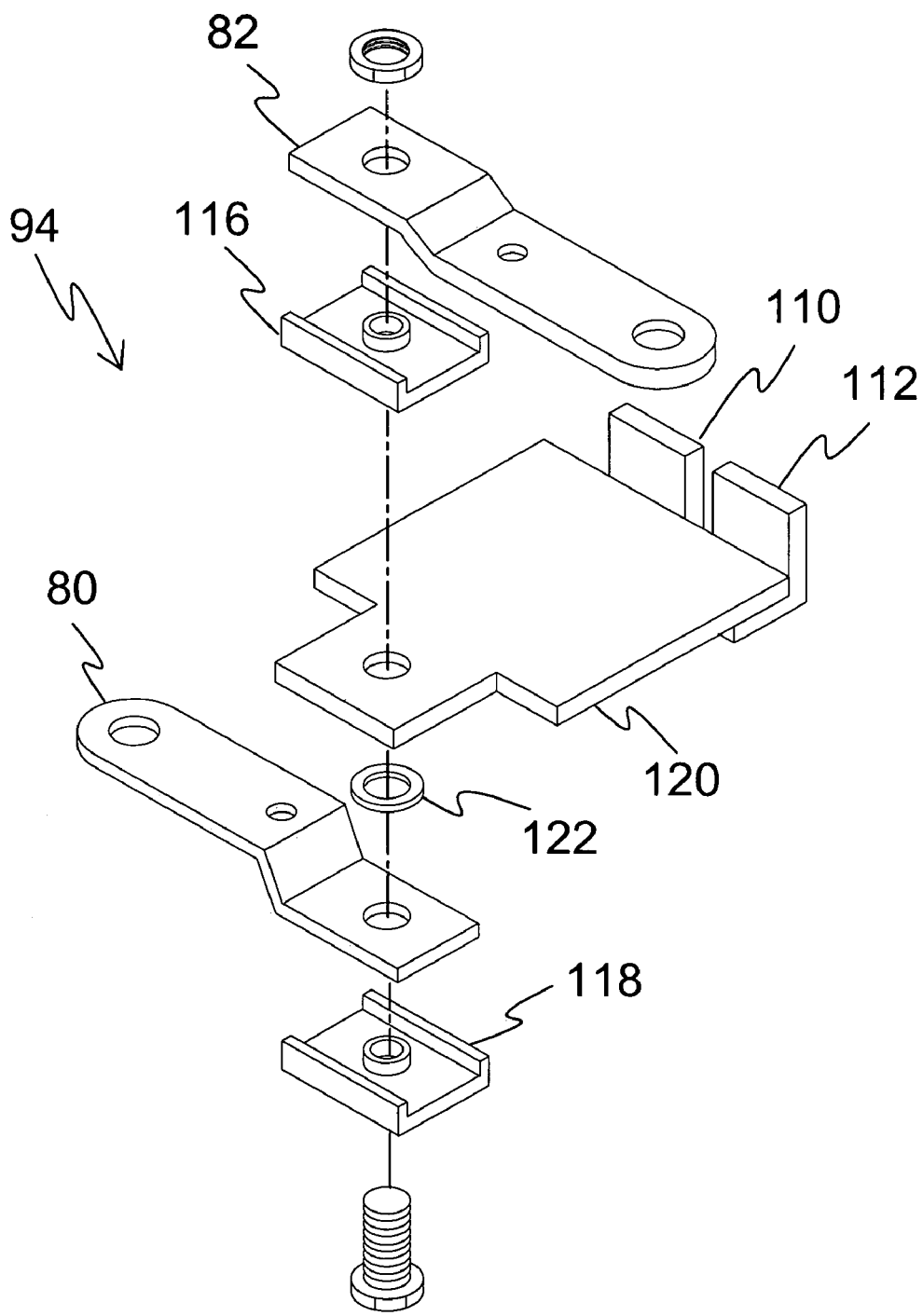
FIG. 16 is an exploded view of the circuit board assembly of the underwater sensor/transmitter probe unit.

FIG. 16 is an exploded view of the circuit board assembly 94 of the underwater sensor/transmitter probe unit comprising a circuit board 120 sandwiched between a second isolator 118, a first connection tab 80 and shim washer 122 and a first isolator 116 and second connection tab 82. a first power contact 110 and a second power contact 112 extend perpendicularly from the edge of the circuit board 120.

Figure 17:
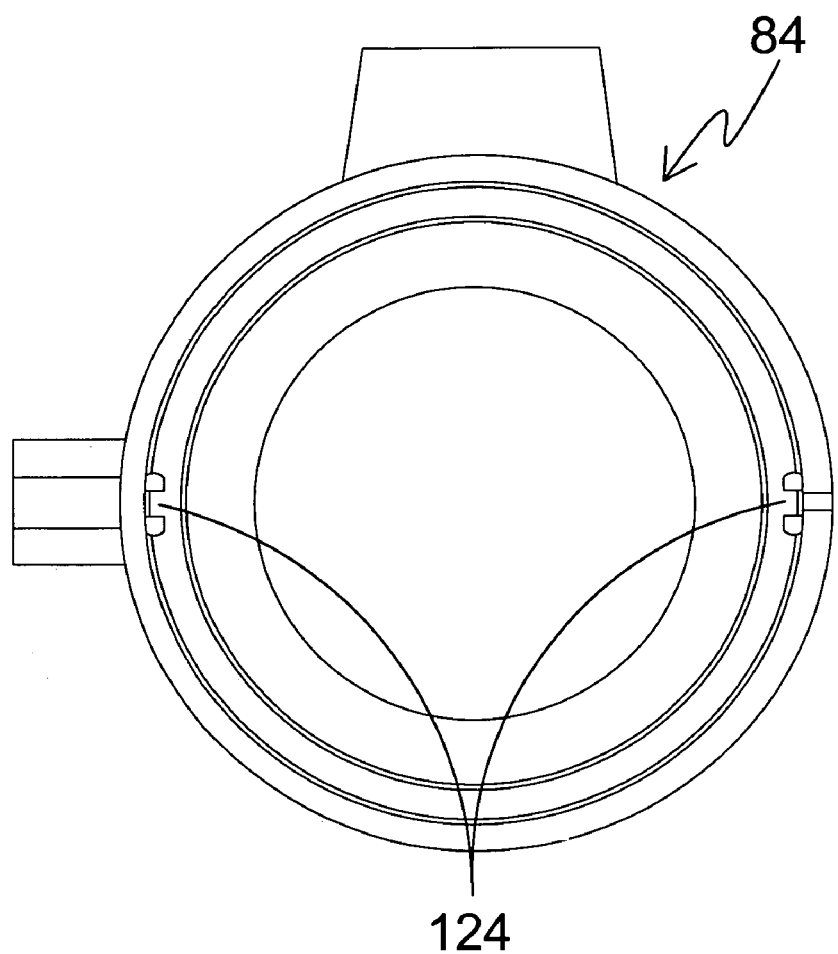
FIG. 17 is an internal view of the main housing of the underwater sensor/transmitter probe unit.

FIG. 17 is an internal view of the main housing 84 of the underwater sensor/transmitter probe unit showing the circuit board alignment channels 124 into which the circuit board and it's related assembly is inserted.

Figure 18:
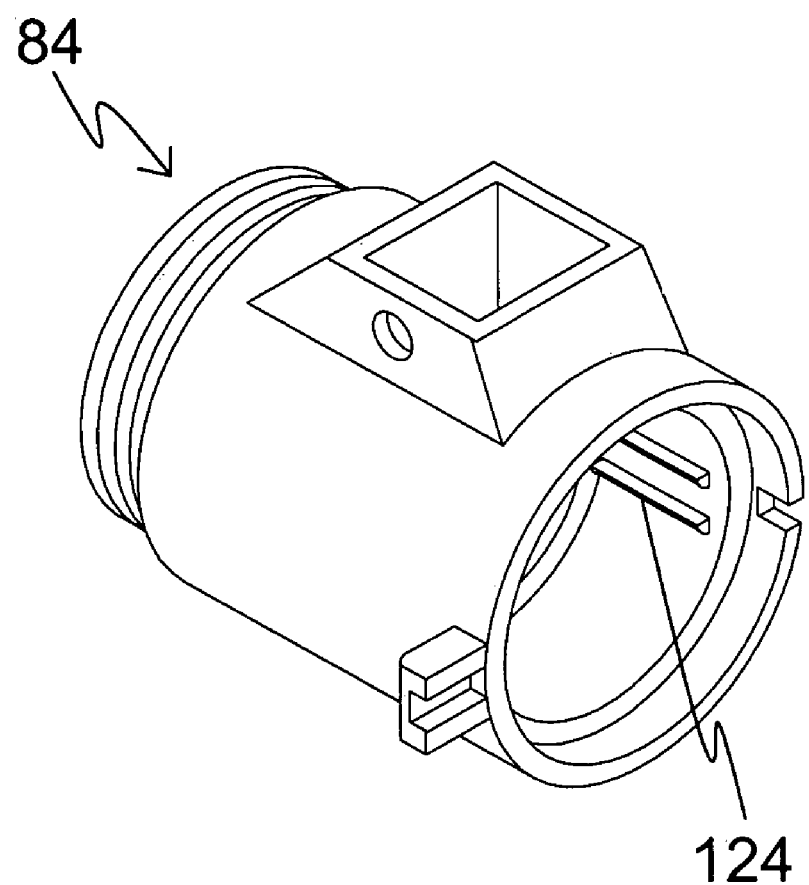
FIG. 18 is an angled internal view of the main housing of the underwater sensor/transmitter probe unit.

FIG. 18 is an angled internal view of the main housing 84 of the underwater sensor/transmitter probe unit showing a circuit board alignment channel 124 into which the circuit board and it's related assembly are to be inserted.

Figure 19:
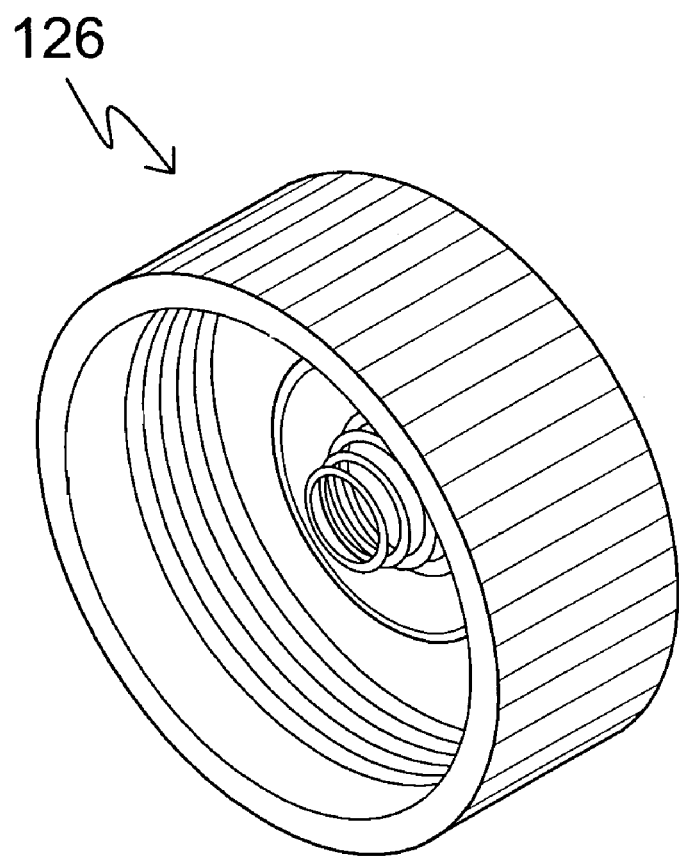
FIG. 19 is a view of the battery access cover assembly.

FIG. 19 is a view of the battery access cove assembly 126.

Figure 20:
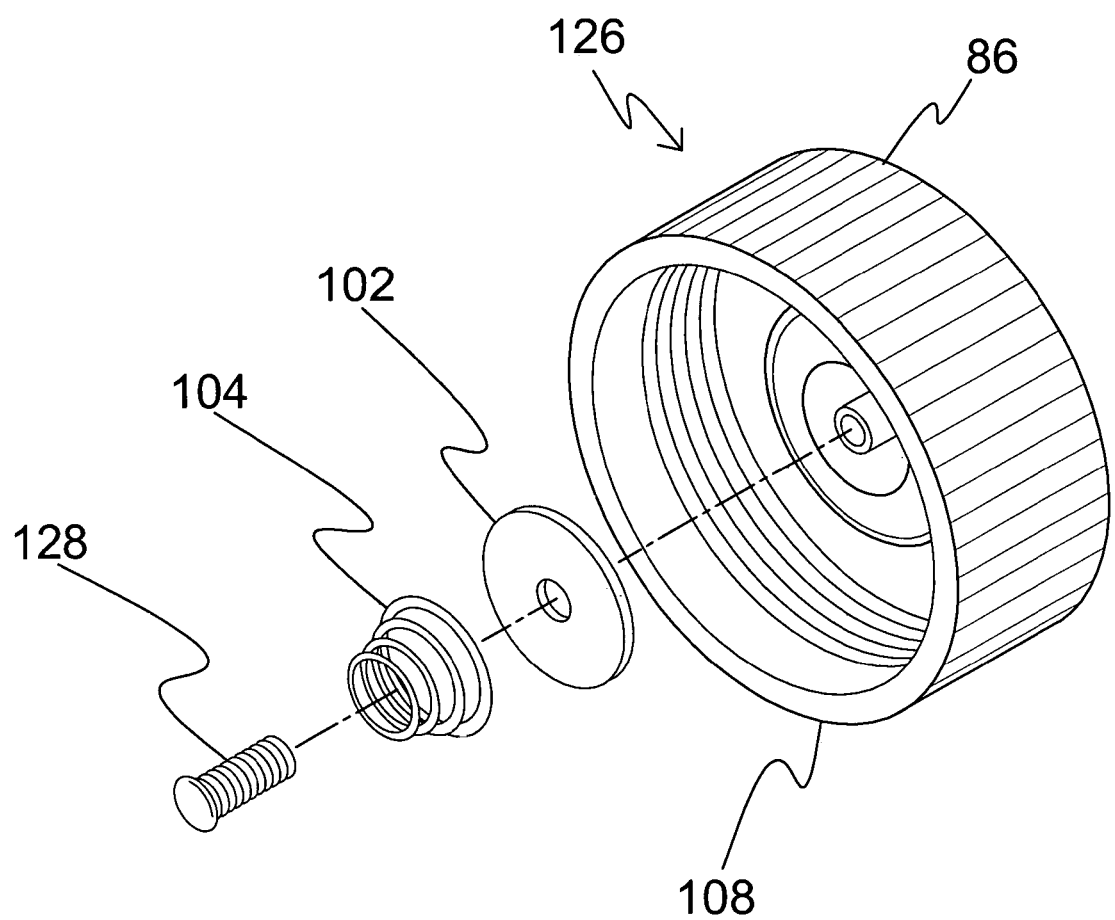
FIG. 20 is an exploded view of the battery access cover assembly.

FIG. 20 is an exploded view of the battery access cover assembly 126 showing the battery access cover 86, the back-up washer 102, the battery retention spring 104, the fastener screw 128 and the second o-ring gland 108.

Figure 21:
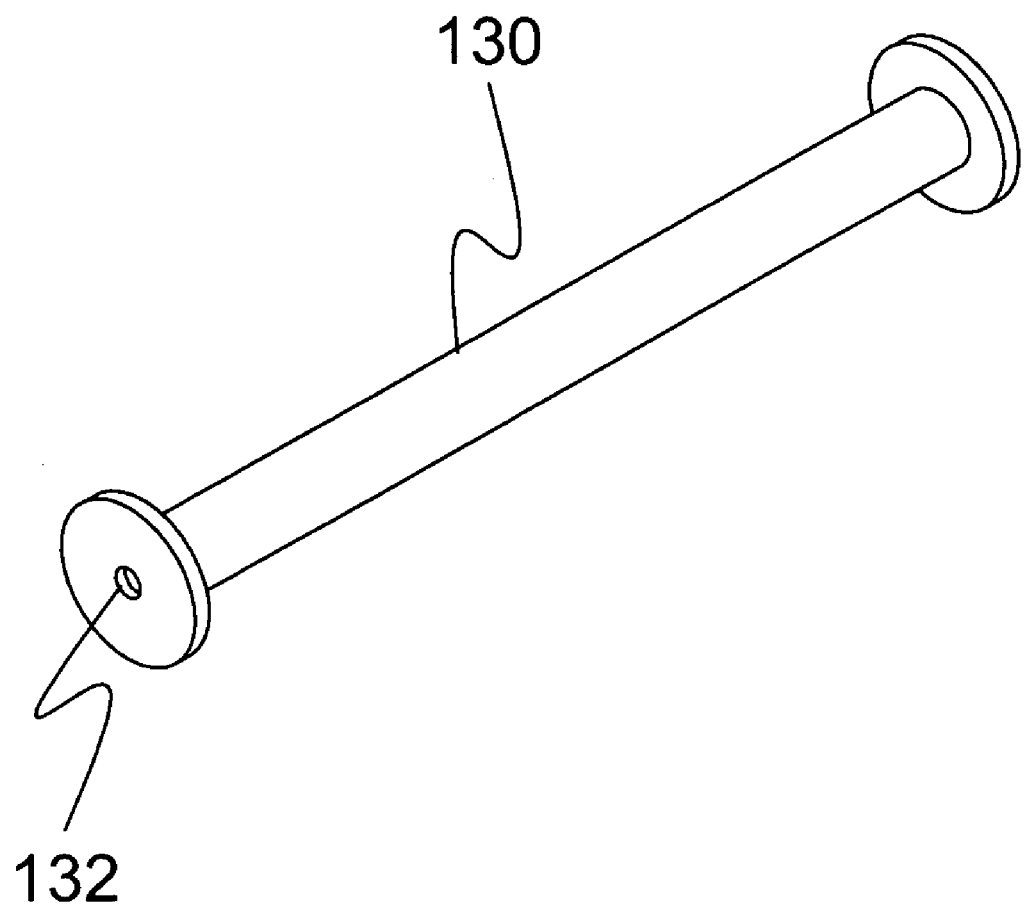
FIG. 21 illustrates a hollow bobbin form in on which the pick-up coil windings are wound.

FIG. 21 illustrates a hollow bobbin 130 form in which the pick-up coil windings are wound and the through-hole 132 extending longitudinally therethrough.

Figure 22:
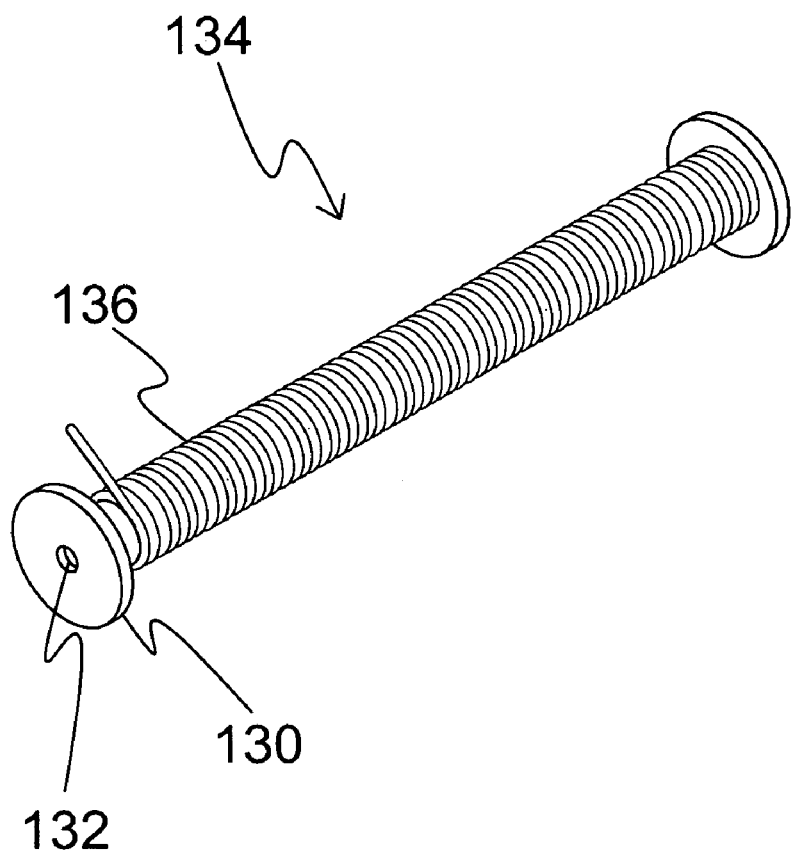
FIG. 22 illustrates a pick-up coil assembly with a single or multiple layers of windings wound onto the bobbin form.

FIG. 22 illustrates a pick-up coil bobbin assembly 134 with a single or multiple layers of windings of insulated wire 136 wound onto the bobbin 130 form and a through-hole 132 extending longitudinally therethrough.

Figure 23:
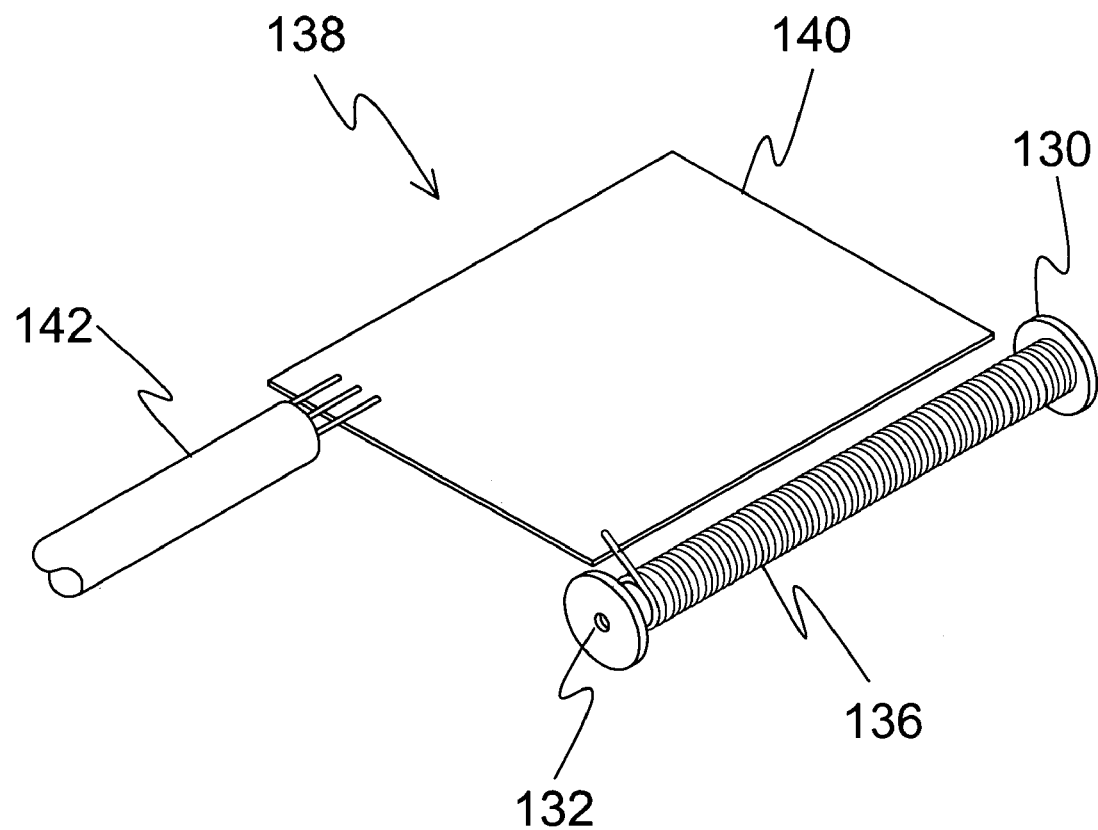
FIG. 23 illustrates an active antenna assembly.

FIG. 23 illustrates an active antenna assembly 138 comprising the insulated wire 136 would around the bobbin 130 in communication with the circuit board 140 and the associated multi-conductor cable 142.

Figure 24:
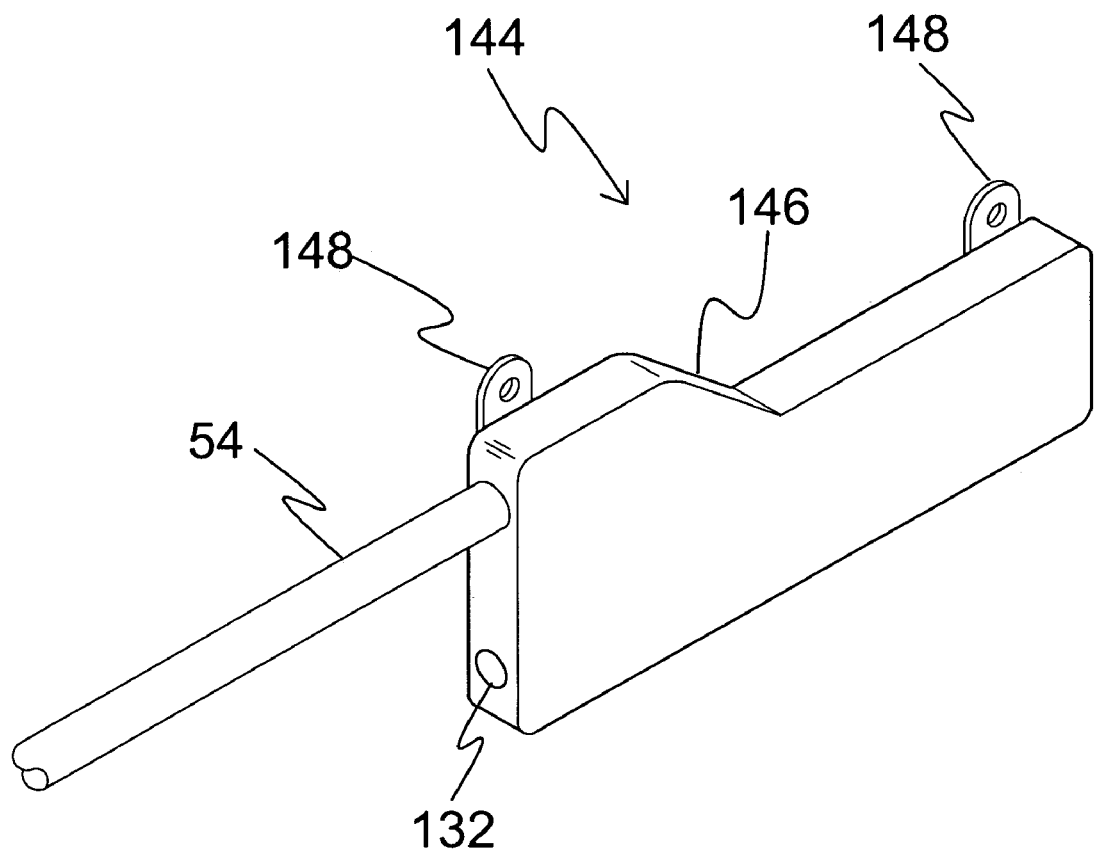
FIG. 24 illustrates a complete antenna module.

FIG. 24 illustrates a complete antenna module assembly 144 comprising an antenna enclosure 146 with a through-bore 132 and a pair of mounting provisions 148 and in direct communication with the antennae cable 54

Figure 25:
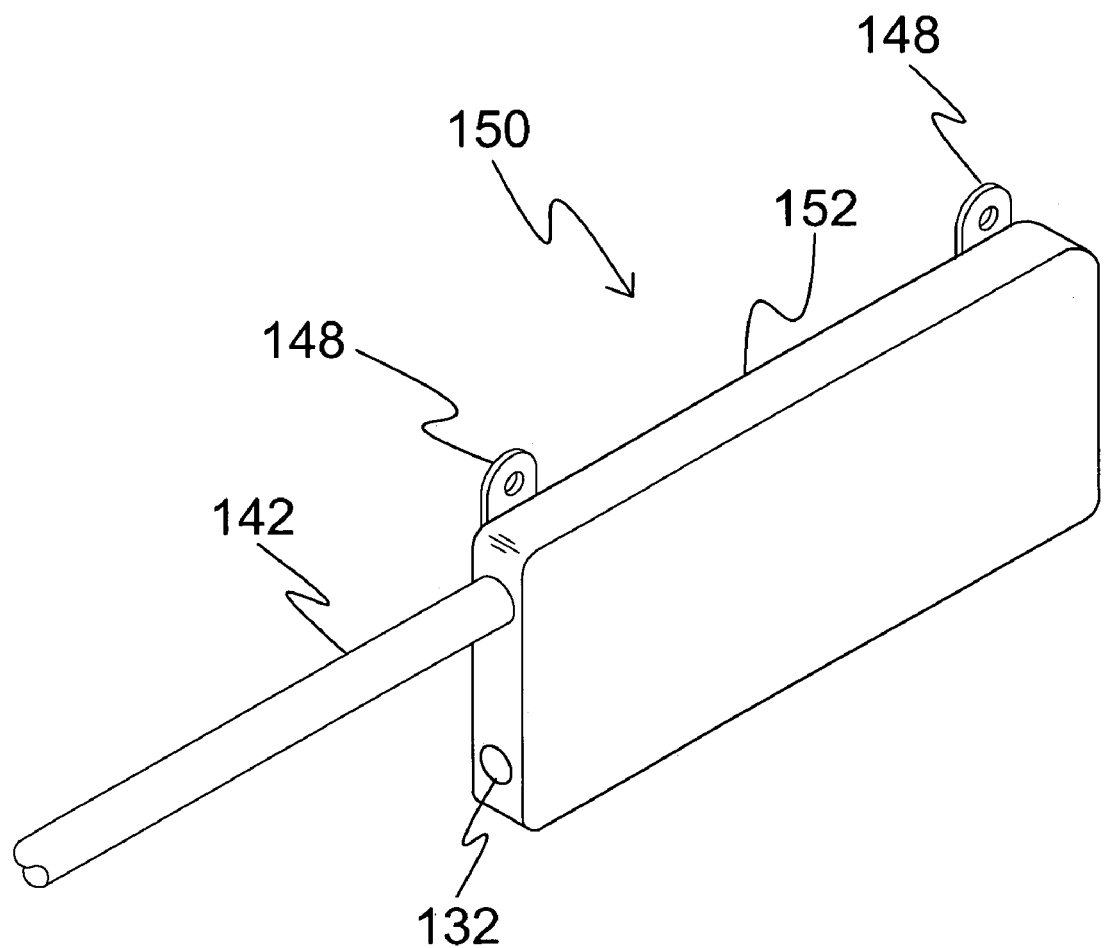
FIG. 25 illustrates a complete active antenna module.

FIG. 25 illustrates a complete active antenna module 150 comprising an active antenna module enclosure 152 with a through-hole 132, a pair of mounting provisions 148 and is in direct communication with the multi-conductor cable 142.

Figure 26:
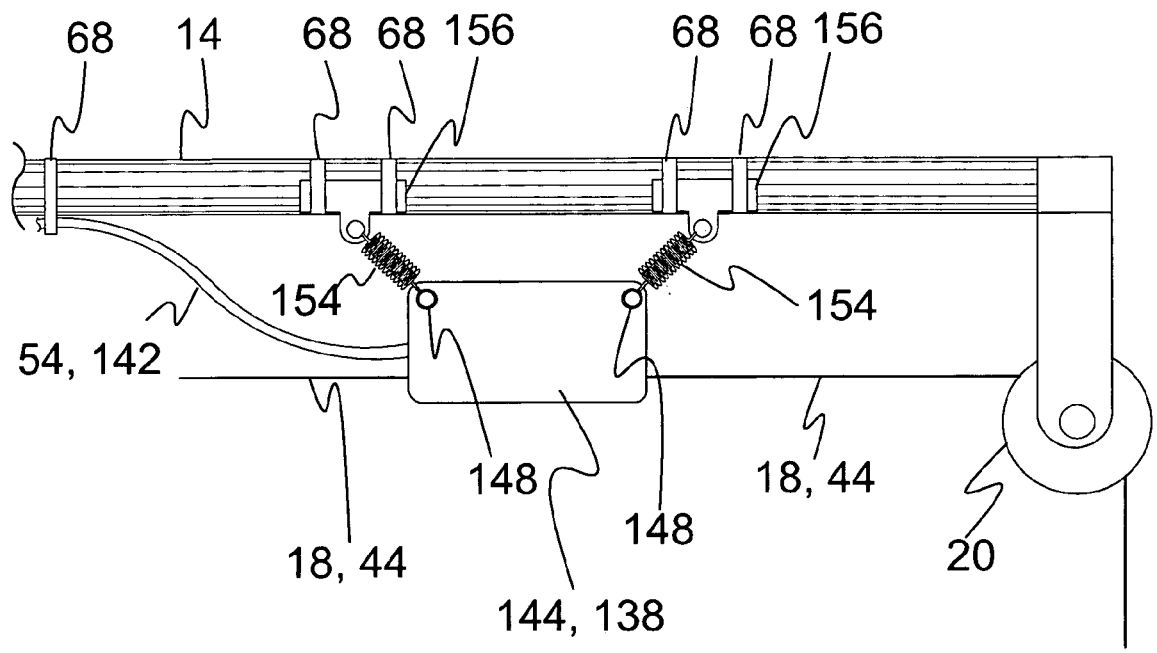
FIG. 26 illustrates a flexible mounting method to mount the antenna module or active antenna module to a downrigger boom.

FIG. 26 illustrates a flexible mounting method to mount the complete active antenna module assembly 138 or the complete antenna module assembly 144 to a downrigger boom 14. The downrigger cable 18,44 passes through the pulley 20 and the though-bore of either the complete active antenna module assembly 138 or the complete antenna module assembly 144 which is suspended by mounting springs 154 engaged with its mounting provisions 148. The mounting springs 154 are fastened to mounting adapters 156 that are secured to the boom 14 by plastic tie-wraps 68. the antenna cable 54 or multi-conductor cable 142 is also secured to the boom 14 with plastic tie-wraps 68 but with enough play to prevent exposure to stress due to the movement of the complete active antenna module assembly 138 or the complete antenna module assembly 144.

Figure 27:
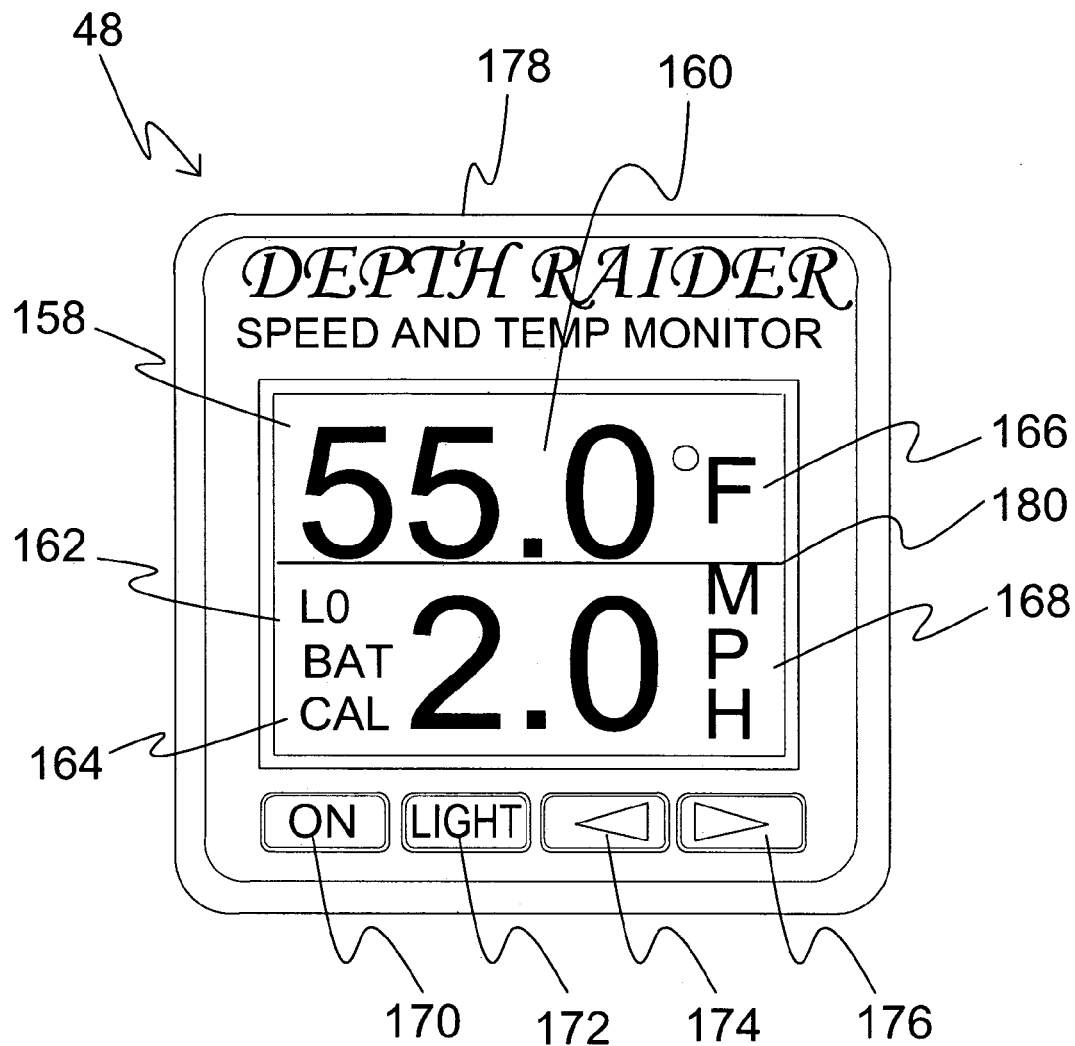
FIG. 27 illustrates a front view of the receiver/display unit.

FIG. 27 illustrates a front view of the receiver/display unit 48 comprising a receiver/display enclosure 178, a first pushbutton 170, a second pushbutton 172, a third pushbutton, 174, a fourth pushbutton 176 and an LCD display 158. The LCD display provides indicators for a LO BAT icon 162, a CALIBRATION mode icon 164, seven segment digits 160, a temperature icon 166, a separator icon 180 and a speed icon 168.

Figure 27A:
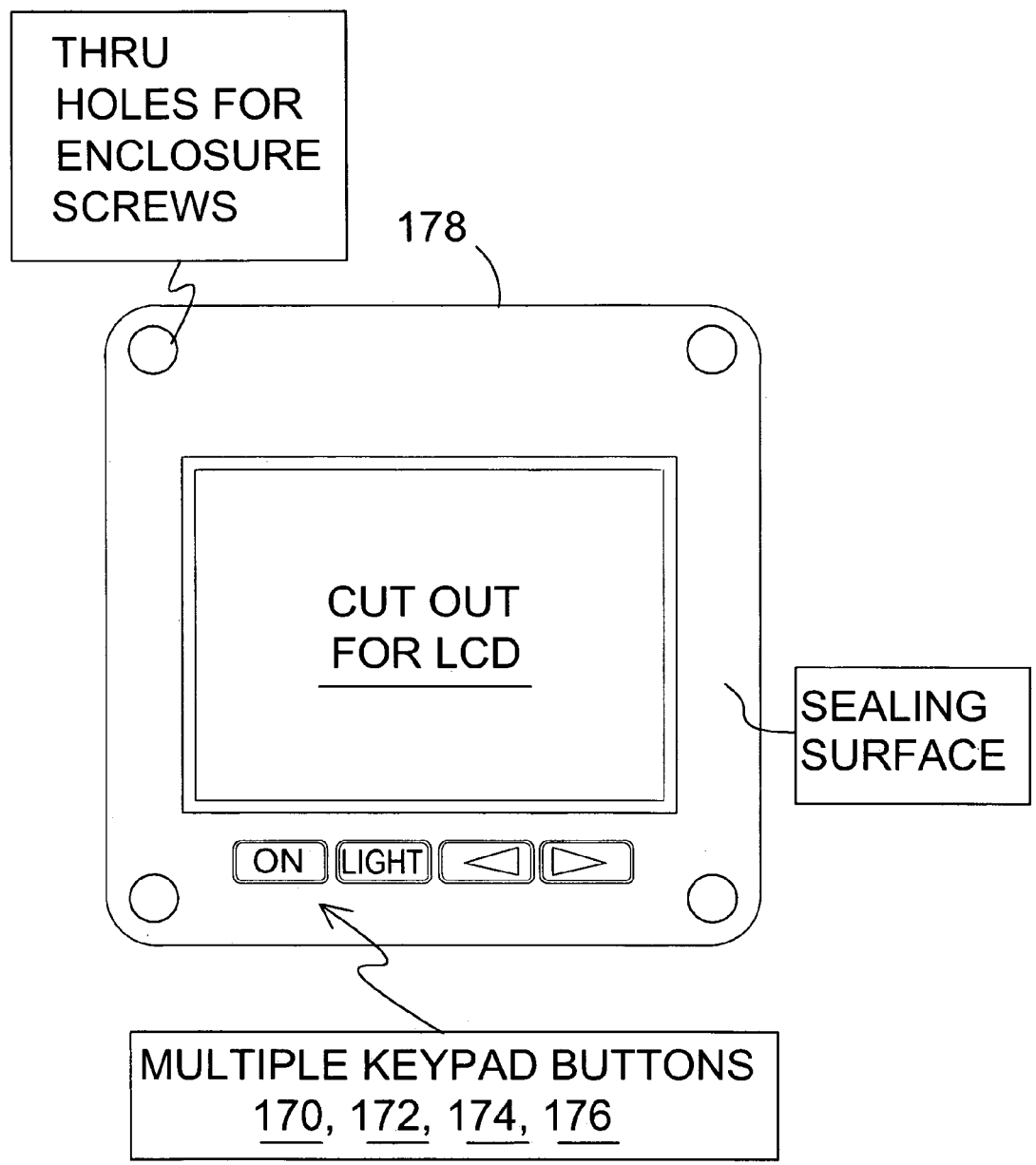
FIG. 27A illustrates a one-piece molded silicone keypad and sealing member.

FIG. 27A illustrates a one-piece molded silicone keypad and sealing member of the receiver/display enclosure 178 with 4 push button 170, 172, 174 and 176.

Figure 28:
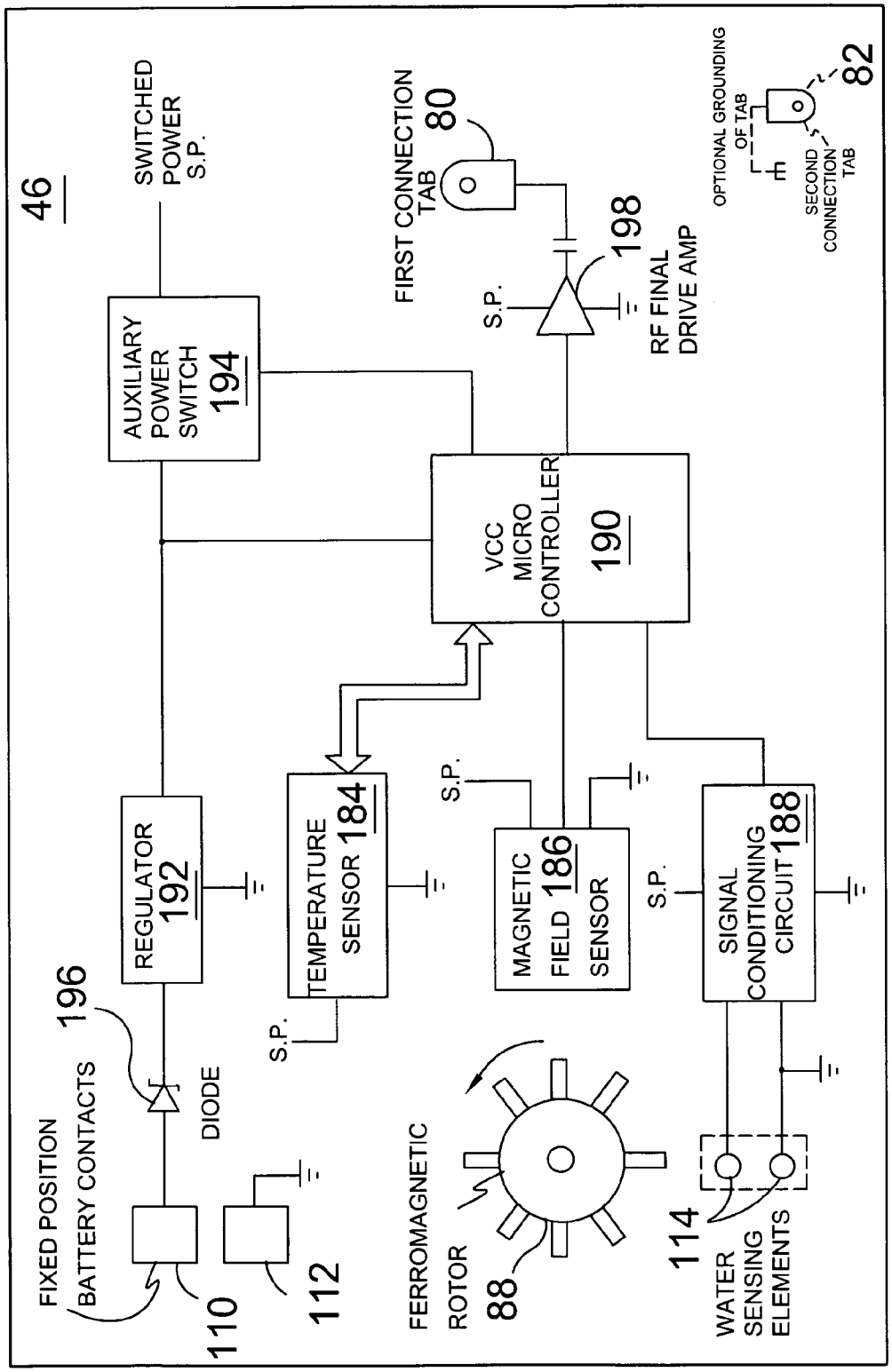
FIG. 28 is an electrical block diagram of the underwater sensor/transmitter probe unit.

FIG. 28 is an electrical block diagram of the underwater sensor/transmitter probe unit 46. The path includes fixed battery contacts 110,112 through a diode 196 and a regulator 192 providing regulated power to the circuitry including the microcontroller 190. The micro-controller 190 receives input from the temperature sensor 184, the magnetic field sensor 186 with affiliated ferromagnetic rotor 88 and from the water sensing elements 114 through the signal conditioning circuit 188. The collected data is then transmitted from the micro-controller 190 to the downrigger cable via the RF final drive amp 198 and the first connection tab 80. The optional grounding of the second connection tab 82 is also shown. The temperature sensor includes a digital interface that preferably has at least 13 bit resolution.

Figure 29:
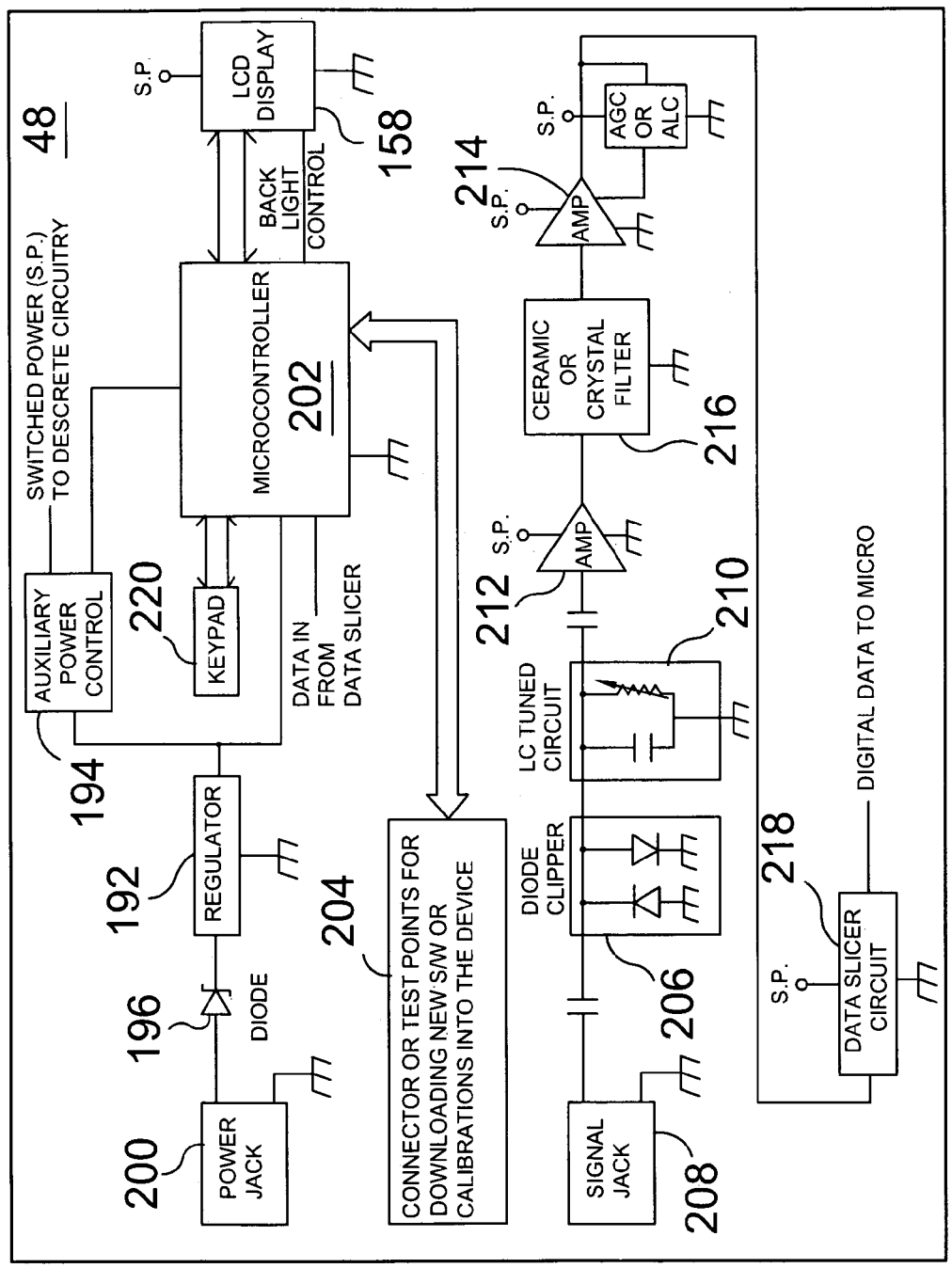
FIG. 29 is an electrical block diagram of the receiver/display unit when used in conjunction with a standard pick-up coil antenna.

FIG. 29 is an electrical block diagram of the receiver/display unit 48 when used in conjunction with a standard pick-up coil antenna. The circuitry includes a power jack 200, a diode 196, a regulator 192, an auxiliary power control 194, a micro-controller 202, a keypad 220, an LCD display 158 and test points 204. The signal receive circuitry contained therein comprises a signal jack 208, a diode clipper 206, an LC tuned circuit 210, a first amp 212, a ceramic or crystal filter 216, a second amp 214, and a data slicer circuit 218.

Figure 30:
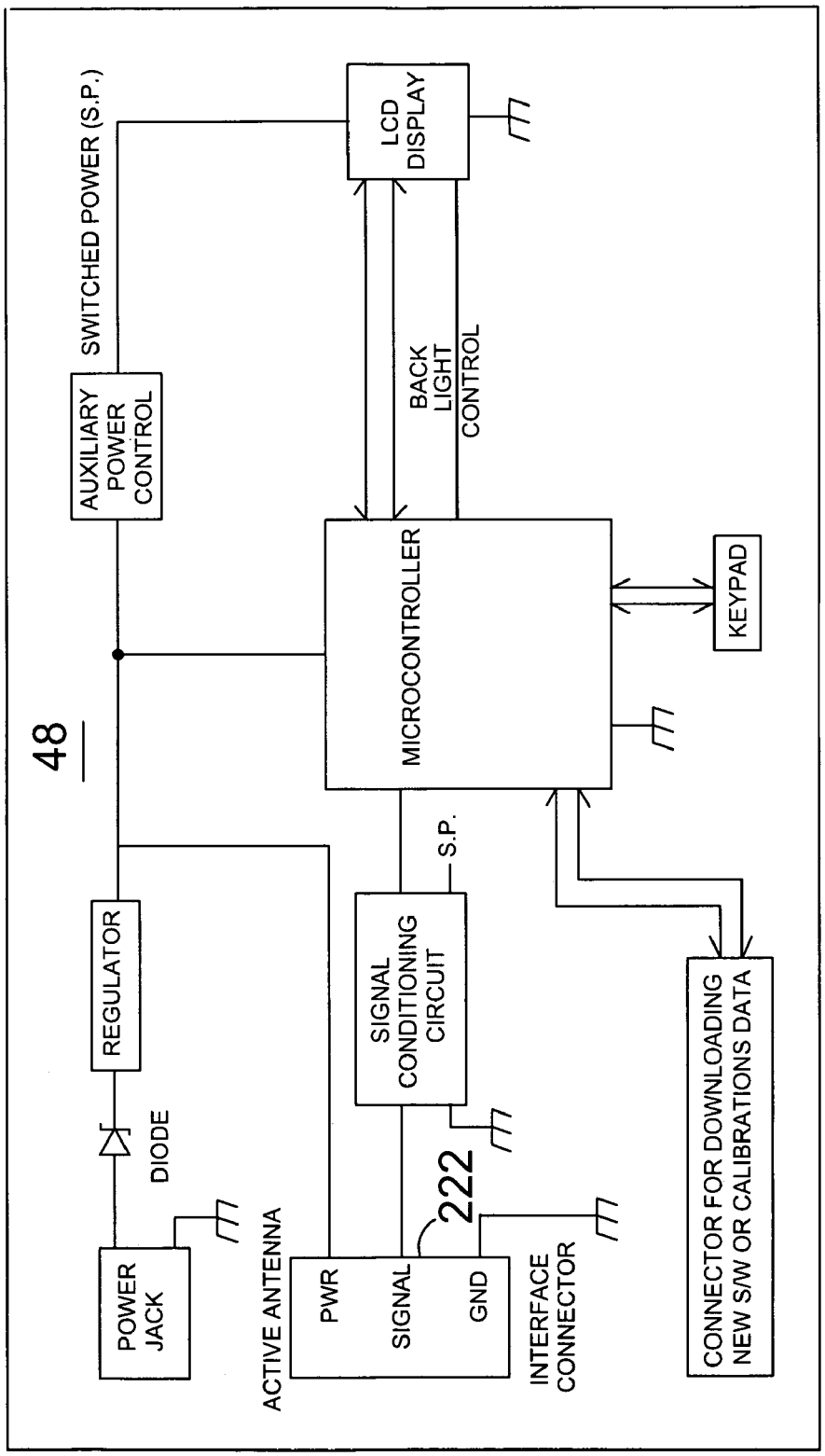
FIG. 30 is an electrical block diagram of the receiver/display unit when used in conjunction with an active antenna module where the signal output of the active antenna module is digital data.

FIG. 30 is an electrical block diagram of the receiver/display unit 48 when used in conjunction with an active antenna module 150 wherein the signal output of the active antenna module 150 is digital data.

Figure 31:
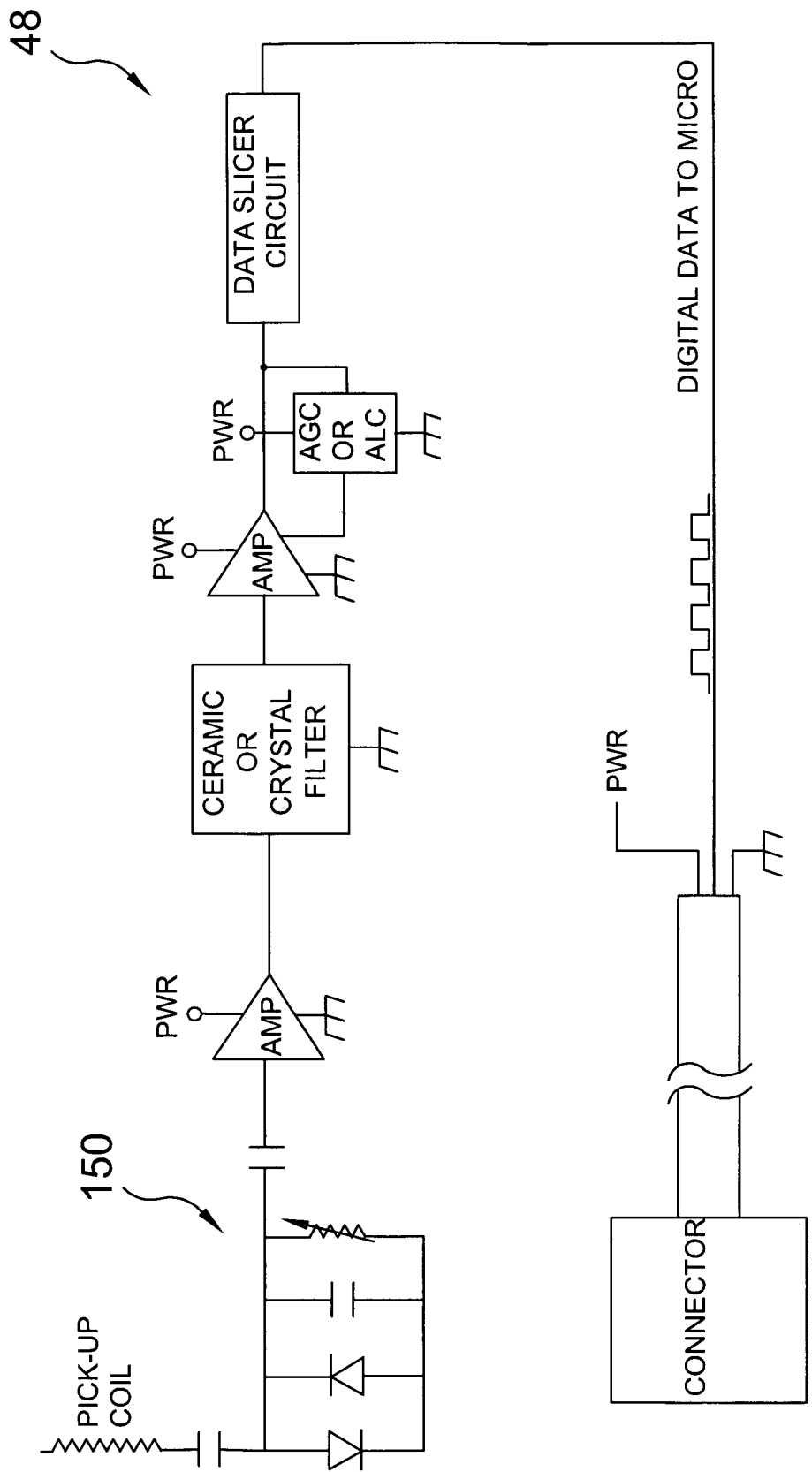
FIG. 31 is an electrical block diagram of an active antenna module where the signal output of the active antenna module is digital data.

FIG. 31 is an electrical block diagram of an active antenna module wherein the signal output of the active antenna module is digital data.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention

What is claimed is:

1. An electronic apparatus for measuring water speed and water temperature and periodically transmitting said measured data onto a downrigger cable comprising:
   a) a housing;
   b) a rotor;
   c) a battery compartment;
   d) a battery access cover;
   e) a microcontroller;
   f) circuitry to sense when said apparatus is in and out of water;
   g) a means to measure temperature of said water;
   h) a means to measure rotation of said rotor;
   i) a driver circuit for transmitting data onto said downrigger cable; and
   j) a means for electrically connecting an output signal by said apparatus to a downrigger cable.

2. The apparatus of claim 1, wherein said microcontroller includes memory.

3. The apparatus of claim 1, wherein said rotor is a ferromagnetic rotor.

4. The apparatus of claim 1, wherein said circuit has provisions to protect said circuitry from damage should the power be installed in a reverse-polarity manner.

5. The apparatus of claim 1, wherein the geometry of the housing is reverse tapered with the front (nose) end having the largest size tapering backward to a smaller size at the end of the housing thereby reducing hydrodynamic drag as well as improving the manufacturability of said housing.

6. The apparatus of claim 1, wherein the Overall length of said apparatus is preferably less than 8' in length.

7. The apparatus of claim 1, wherein the cross-sectional area of the apparatus measured at its maximum cross-sectional area (assuming the body is a solid and the rotor housing is a solid) measures less than 3.35 square inches.

8. The apparatus of claim 1, wherein said housing has a nose and said nose is substantially elliptical in shape to minimize the hydrodynamic drag of said apparatus.

9. The apparatus of claim 1, wherein said battery access cover features a knurled surface to aid in removal and installation thereof when the user's hands may be wet and slippery.

10. The apparatus of claim 1, further including stabilization fins, which aid in allowing said apparatus to track parallel to the path of the watercraft's movement.

11. The apparatus of claim 1, wherein said circuitry is completely encapsulated in a material to seal the electronics and thus prevent damage to said electronics from water intrusion or other foreign materials.

12. The apparatus of claim 1, wherein said rotation sensing means is a Hall Effect device.

13. The apparatus of claim 12, wherein said Hall Effect sensor has internal chopper circuitry thereby greatly reducing its average current consumption.

14. The apparatus of claim 1, wherein said housing comprises a main body, a nosepiece and a battery access cover.

15. The apparatus of claim 14, wherein the rotor mounting detail is constructed at the same time as said main body.

16. The apparatus of claim 1, wherein said means to measure temperature of said water is a temperature sensor device.

17. The apparatus of claim 16, wherein said temperature sensor includes a digital interface.

18. The apparatus of claim 17, wherein said digital interface preferably has at least 13 bit digital resolution.

19. The apparatus of claim 1, further including channels internal to said housing that are used to guide said circuit board assembly into the proper position.

20. The apparatus of claim 19, wherein said channels are positioned within said housing such that said circuit, board is positioned at the centerline of said housing.

21. The apparatus of claim 19, that includes a battery alignment cavity with tabs that slideably insert into said channels wherein said battery alignment housing is slightly larger than said battery and employed to ensure proper alignment of the battery terminals with the fixed position power contacts on the circuit board assembly.

22. The apparatus of claim 1, wherein said battery access cover is attached to said housing by means of screw threads, and the screw threads are internal to said battery access cover, and the mating threads on said housing are external threads.

23. The apparatus of claim 22, wherein said battery access cover contains one O-ring at the internal base thereof that mates with the end surface of said housing.

24. The apparatus of claim 22, wherein said housing contains a gland for placement of an O-ring seal, with said gland located prior to the start of said external screw threads but after the end of said housing's outer surface.

25. The apparatus of claim 1, wherein said absence of water results in said circuit entering an ultra-low power sleep mode.

26. The apparatus of claim 25, wherein said ultra-low power sleep mode consumes less than 200uA of current.

27. The apparatus of claim 25, wherein said ultra-low power circuitry senses when said apparatus is again placed in said water thereby forcing the circuit to enter run mode.

28. The apparatus of claim 27, wherein the average current consumption is less than 1.75 mA.

29. The apparatus of claim 1, wherein said circuit includes a circuit board.

30. The apparatus of claim 29, wherein said temperature sensing device is mounted on said circuit board.

31. The apparatus of claim 29, wherein said magnetic sensor is mounted on said circuit board preferably directly below the centerline of axis of rotation of said ferromagnetic rotor.

32. The apparatus of claim 29, wherein said temperature sensor is preferably positioned substantially below the centerline of axis of rotation of said rotor.

33. The apparatus of claim 1, wherein said circuit transmits sensed data by means of a modulated carrier.

34. The apparatus of claim 33, where the carrier frequency is substantially 455 KHz.

35. The apparatus of claim 33, wherein the modulation method is Amplitude Shift Key (ASK).

36. The apparatus of claim 33, wherein the modulation method is Frequency Shift Key (FSK).

37. The apparatus of claim 33, wherein the modulation method is both ASK and FSK.

38. The apparatus of claim 1, wherein said circuit includes at least one electrically conductive element penetrating said housing forming means for sensing the presence or absence of water.

39. The apparatus of claim 38, wherein said means for sensing is comprised of measuring resistance between said electrically conductive element and another electrically-conductive circuit element.

40. The apparatus of claim 38, wherein said means for sensing is comprised of measuring resistance between said electrically conductive element and circuit ground.

41. The apparatus of claim 38, wherein said means for sensing is comprised of measuring current between said electrically conductive element and another electrically-conductive circuit element.

42. The apparatus of claim 38, wherein said means for sensing is comprised of measuring current between said electrically conductive element and circuit ground.

43. The apparatus of claim 1, further including multiple fixed position battery contacts in the form of contacts to eliminate the need for wires and a snap terminal arrangement.

44. The apparatus of claim 43, wherein said battery access cover contains a spring mounted in the inside end of said, cap to provide pressure on said battery thus pressing said battery terminals onto said fixed position mating contacts thereby ensuring reliable contact therebetween.

45. The apparatus of claim 43, wherein said fixed position battery contacts are mounted to said circuit board either directly or by means of stand-offs thereby eliminating the need for hand wiring said battery contacts to said circuit board.

46. The apparatus of claim 43, wherein said fixed position battery contacts are constructed from a material that resists corrosion.

47. The apparatus of claim 46, wherein said fixed position battery contacts are constructed of stainless steel.

48. The apparatus of claim 46, wherein the fixed position battery contacts are constructed of nickel plated brass.

49. The apparatus of claim 1, having a first mounting tab and a second mounting tab wherein the first mounting tab is electrically connected to the output driver circuitry of said apparatus and the second mounting tab is electrically isolated from all apparatus circuitry.

50. The apparatus of claim 49, wherein said first and second mounting tabs are constructed of stainless steel.

51. The apparatus of claim 49, wherein said first mounting tab and said second mounting tab have identical physical dimensions to allow both tabs to be manufactured from the same tooling thus offering a savings in tooling investment and a reduction in piece part price as well as reduce errors in assembly.

52. The apparatus of claim 49, wherein the second mounting tab is electrically connected to circuit ground.

53. The apparatus of claim 49, wherein said first mounting tab has a raised flange of non-conductive material completely surrounding said first mounting tab such that rubberized electrical tape can be easily applied to the tab and downrigger cable interconnect thereby ensuring electrical isolation of the connection from the surrounding water.

54. The apparatus of claim 49, wherein said mounting tabs are assembled with fastening hardware in conjunction with multiple isolation bushings so as to sandwich said circuit board assembly in such a fashion that said first mounting tab comes in electrical contact with the RF signal driving circuit by means of the sandwich; and the assembly is also such that said second mounting tab becomes electrically isolated from said first mounting tab and apparatus circuitry while the complete assembly of circuit board and connecting tabs provides adequate mechanical strength to support a cannonball of heavy weight suspending from said second connecting tab.

55. The apparatus of claim 54, wherein the connecting means of said mounting tabs, isolators, shims, and circuit board is that of a bolt & nut.

56. An electronic apparatus for measuring water speed and water temperature and periodically transmitting said measured data onto a downrigger cable comprising:
   a) a housing;
   b) a rotor;
   c) a battery compartment;
   d) a battery access cover;
   e) fixed position battery contacts;
   f) a means to measure temperature of said water;
   g) a means to measure rotation of said rotor;
   h) a driver circuit for transmitting data onto said downrigger cable; and
   j) a means for electrically connecting an output signal of said apparatus to a downrigger cable.

57. The apparatus of claim 56, further including a microcontroller.

58. The apparatus of claim 56, wherein the fixed position battery contacts are constructed of stainless steel.

59. The apparatus of claim 56, wherein the geometry of the housing is reverse tapered with the front (nose) end having the largest size tapering backward to a smaller size at the end opposite end of the housing thereby reducing hydrodynamic drag as well as improving the manufacturability of said housing.

60. The apparatus of claim 56, wherein the rotor is constructed of ferromagnetic material.

61. The apparatus of claim 56, wherein said battery access cover is attached to said housing by means of screw threads, and the screw threads are internal to said battery access cover, and the mating, threads on said housing are external threads.

62. The apparatus of claim 56, further including circuitry to sense when said apparatus is in the water and when out of the water.

63. The apparatus of claim 56, wherein said circuitry is completely encapsulated in a material to seal the electronics and thus prevent damage to said electronics from water intrusion or other foreign materials.

64. An electronic apparatus for measuring water speed and water temperature and periodically transmitting said measured data onto a downrigger cable comprising:
   a) a housing and battery access cover wherein said battery access cover is attached to said housing by means of screw threads, and the screw threads are internal to said battery access cover, and the mating threads on said housing are external threads;
   b) a rotor;
   c) a battery compartment;
   d) a means to measure temperature of said water;
   e) a means to measure rotation of said rotor;
   f) a driver circuit for transmitting data onto said downrigger cable; and
   g) a means for electrically connecting an output signal of said apparatus to a downrigger cable.

65. The apparatus of claim 64, further including fixed position battery contact.

66. The apparatus of claim 64, wherein the fixed position battery contacts are constructed of stainless steel.

67. The apparatus of claim 64, wherein the geometry of the housing is reverse tapered with the front end having the largest size tapering backward to a smaller size at the end opposite end of the housing thereby reducing hydrodynamic drag as well as improving the manufacturability of said body.

68. The apparatus of claim 64, further including a microcontroller.

69. The apparatus of claim 64, wherein the rotor is constructed of ferromagnetic material.

70. The apparatus of claim 64, further including circuitry to sense when said apparatus is in or out of water.

71. The apparatus of claim 64, wherein said circuitry is completely encapsulated in a material to seal the electronics and thus prevent damage to said electronics from water intrusion or other foreign materials.

* * * * *